US010735285B2

(12) United States Patent
Verma et al.

(10) Patent No.: US 10,735,285 B2
(45) Date of Patent: Aug. 4, 2020

(54) SYSTEMS AND METHODS FOR IDENTIFYING AND MITIGATING OUTLIER NETWORK ACTIVITY

(71) Applicant: Accenture Global Solutions Limited, Dublin (IE)

(72) Inventors: Mayank Verma, London (GB); Loizos Markides, London (GB); Athina Kanioura, London (GB); Ray Eitel Porter, London (GB); Gerasimos Mileounis, London (GB); Kieran Towey, London (GB); Mark Ghannam, London (GB); Vladyslav Yakovenko, London (GB)

(73) Assignee: Accenture Global Solutions Limited, Dublin (IE)

( * ) Notice: Subject to any disclaimer, the term of this patent is extended or adjusted under 35 U.S.C. 154(b) by 82 days.

(21) Appl. No.: 16/059,532

(22) Filed: Aug. 9, 2018

(65) Prior Publication Data
US 2019/0132224 A1 May 2, 2019

(30) Foreign Application Priority Data

Oct. 26, 2017 (EP) ..................................... 17386042

(51) Int. Cl.
*G06F 15/173* (2006.01)
*H04L 12/26* (2006.01)
(Continued)

(52) U.S. Cl.
CPC .......... *H04L 43/062* (2013.01); *G06K 9/6267* (2013.01); *H04L 41/16* (2013.01);
(Continued)

(58) Field of Classification Search
CPC ............. H04L 63/1416; H04L 63/1425; G06F 21/552
See application file for complete search history.

(56) References Cited

U.S. PATENT DOCUMENTS 8,762,298 B1\* 6/2014 Ranjan ..................... G06N 5/02
706/12
2016/0191560 A1\* 6/2016 Pegna ................... G06F 21/552
726/23
2017/0201451 A1\* 7/2017 Allan ...................... H04L 45/12

OTHER PUBLICATIONS

Extended European Search report issued for European Patent Application No. 17386042.0, dated Jan. 17, 2018, 10 pages.

\* cited by examiner

*Primary Examiner* — Yves Dalencourt
(74) *Attorney, Agent, or Firm* — Norton Rose Fulbright US LLP

(57) ABSTRACT

Embodiments provide systems and methods for identifying and mitigating outlier network activity. In embodiments, network activity by a plurality of users may be monitored and, based on the monitoring, a plurality of data sets may be compiled. Each of the plurality data sets may include information representative of activity by the plurality of users. A network model representative of at least a portion of the network activity may be constructed based on one or more of the plurality of data sets. The network model may be evaluated against a set of rules to produce outputs that include at least one of: a set of classifications, a set of link metrics, and a set of communities. Decision engine logic may be executed against the outputs to identify outlier network activity. In response to identifying outlier network activity, operations to mitigate the identified outlier network activity may be executed.

20 Claims, 12 Drawing Sheets

(51) Int. Cl.
*H04L 29/06* (2006.01)
*G06K 9/62* (2006.01)
*H04L 12/24* (2006.01)
*H04L 12/851* (2013.01)
*G06Q 20/40* (2012.01)
*H04L 29/08* (2006.01)
*G06F 21/55* (2013.01)

(52) U.S. Cl.
CPC ............ *H04L 43/04* (2013.01); *H04L 43/065* (2013.01); *H04L 47/2441* (2013.01); *H04L 63/0263* (2013.01); *H04L 63/1425* (2013.01); *G06F 21/552* (2013.01); *G06Q 20/4016* (2013.01); *H04L 67/22* (2013.01)

SYSTEMS AND METHODS FOR IDENTIFYING AND MITIGATING OUTLIER NETWORK ACTIVITY

CROSS-REFERENCE TO RELATED APPLICATION

The present application claims priority to European Patent Application No. EP 17 386 042.0 filed Oct. 26, 2017 and entitled "SYSTEMS AND METHODS FOR IDENTIFYING AND MITIGATING OUTLIER NETWORK ACTIVITY," the disclosure of Which is incorporated by reference herein in its entirety.

TECHNICAL FIELD

The present application relates to systems and methods for analyzing network activity and, more particularly, to systems and methods for identifying outlier network activity.

BACKGROUND

Previous attempts to develop outlier network activity detection systems have been based on rules driven and static analysis models. These systems are not updated frequently based on final outcomes, resulting in an inefficient system that is unable to effectively distinguish normal behavior from outlier behavior due to an inability to truly "learn" new patterns in outlier activity. For example, systems that utilize simple threshold detection schemes suffer from problems associated with how the thresholds should be set. If the thresholds are set too high, some outlier network activity may not be detected, and if the thresholds are set too low, the system may generate a lot of false positive indications of outlier network activity, such as flagging network activity as outlier network activity when it is not. Additionally, although thresholds utilized by these systems may be periodically updated, such as once a year, these adjustments are often insufficient with respect to solving the above-described deficiencies. For example, if outlier network activity remained static such that patterns of activity associated with outlier network activity were constant, these threshold detection systems may eventually converge on a set of thresholds that accurately detect all outlier network activity. However, outlier network activities evolve over time as the network users change their behaviors in an attempt to circumvent detection. Thus, systems implementing simple threshold detection schemes are always behind the curve with respect to new and emerging outlier network activities, which may go undetected by those systems for a prolonged period of time. Systems that suffer from the above-identified inefficiencies with respect to accurately identifying outlier activity may fail to meet regulatory expectations and may also fail to identify and report spurious behaviors in a timely manner.

SUMMARY

The present application is directed to systems and methods for identifying and mitigating outlier network activity. According to embodiments of the present disclosure, an outlier network activity detection and mitigation system is configured to transform an organization's data, which is usually activity-based, into one or more models that conceptualize interactions between network users and their behaviors. The system may be configured to evaluate the one or more models against one or more rule sets to identify behavioral similarities between the network users. The identified similarities may encompass similarities in user activity, user demographics, user centric attributes, and other similarities. Through evaluation of the one or more models against the one or more rule sets, systems operating in accordance with embodiments generate a set of outlier network activity predictions based on behavioral similarities between the modeled network user behaviors and the behaviors of known outlier network activities. Systems are further configured to execute decision engine logic against the set of outlier network activity predictions to identify outlier network activity within the network model(s).

Additionally, embodiments of outlier network activity detection and mitigation systems according to the present disclosure may be configured to execute various processes to mitigate threats associated with identified outlier network activity. For example, upon identifying a user that is exhibiting behaviors characteristic of outlier network activity, the user's account and/or device(s) may be disabled, thereby preventing the user from accessing one or more networks and/or network resources to engage in outlier network activities. As another example, the system may identify one or more users that have associations with (e.g., through behavioral similarities or other identifiable characteristics) known outliers and may limit those users' access to services and/or network resources until further evaluation has been completed.

To illustrate, systems and methods according to embodiments may be configured to identify outlier network activity that poses a threat to an entity's cybersecurity and execute processes to mitigate identified cybersecurity threats. For example, a service provider may provide one or more services to its subscribers via a network (e.g., the Internet). The service provider may maintain a database of information associated with its subscribers and their use of the one or more services. To identify potential threats to the service provider's cybersecurity, the information stored in the service provider's database may be provided to a system operating in accordance with embodiments of the present disclosure. The system may construct one or more network models based on the service provider's information. The one or more models may include information that conceptualizes the behaviors of the network users and their interactions with other network users and/or the one or more services. The system may then evaluate one or more of the models against one or more rule sets to identify behavioral similarities between the network users. As a result of the evaluation of the model(s), the system may generate a set of outlier network activity predictions and may execute decision engine logic against the set of predictions to identify one or more network users that exhibit behaviors similar to known outlier network users (e.g., hackers, malicious users, and the like). After the system identifies these potential cybersecurity threats, the system may execute one or more processes to mitigate those threats. For example, the system may disable or restrict access to the one or more services by those network users, disable one or more devices associated with those network users, or other threat mitigation processes.

The outlier network activity detection and mitigation techniques utilized by embodiments of the present disclosure leverages an organization's existing networks and data to provide a holistic understanding of network users and their behavior. Additionally, when compared to systems that utilize thresholds, the behavior-based approach to identifying outlier network activity utilized by systems of the present disclosure provides an improved technological-based system that more accurately identifies instances of outlier network activity. As a result of these improvements, a total analysis time for each raised case may be reduced, allowing more cases to be identified and/or processed through the system. Furthermore, by moving to a user level monitoring approach, the systems disclosed herein may enable additional internal and external data to be integrated into the outlier network activity analysis. Additionally, in aspects, the systems and methods of the present disclosure may allow for faster detection of new, previously unseen outlier network activity patterns and behaviors through analysis of cliques of network users with unknown and/or emerging behaviors. In aspects, the systems and methods disclosed herein may be updated and readjusted in real-time based on feedback derived from a prior analysis of the network activity and may provide interactive visualization tools that may facilitate faster analysis of the identified cases of outlier network activity.

In aspects, the disclosed systems and methods may transform existing network data into one or more network models, such as one or more graphs, and interactive tools for identifying and analyzing outlier network activity. While traditional analytical techniques (e.g., the techniques used by systems that implement static threshold schemes) fail to detect outlier network activity due to a lack of evidence, graph-based analysis according to the present disclosure provides new insights by investigating how network users influence/interact with each other. For example, a graph-based analysis may enable identification of outlier network activity based on abnormal-by-association analysis, where the graph analysis assumes that abnormal influences run through groups of network users exhibiting behavioral similarities. By creating and analyzing an abnormal network, new insights into the abnormality of a behavior can be identified and steps can be taken to prevent pursuit of that behavior. Thus, in contrast to prior outlier detection systems, which rely heavily on identification of abnormal patterns of activity at an individual entity level (e.g., an individual user) based on a defined threshold set at a segment level (e.g., a user type, a transaction type, a product type, and the like), outlier detection systems according to the present disclosure perform analysis on behavioral characteristics of users and/or user groups, which provides a more robust analysis of behaviors of interest, such as outlier network activity.

In aspects, a method for identifying outlier network activity is disclosed and may include monitoring, by a processor, activity by a plurality of users. The method may also include compiling, by the processor, a plurality of data sets based on the monitoring. In aspects, each of the plurality data sets may include information representative of the activity by the plurality of users. The method may also include constructing, by the processor, a network model based on one or more of the plurality of data sets. In aspects, the network model may be representative of at least a portion of the activity. The method may also include evaluating, by the processor, the network model against a set of rules to produce a plurality of outputs. In aspects, the plurality of outputs may include at least one of: a set of classifications, a set of link metrics, and a set of communities. In aspects, the method may include executing, by the processor, decision engine logic against the plurality of outputs to identify outlier network activity.

In aspects, a system for identifying outlier activity is disclosed. In aspects, the system may include at least one processor and a memory coupled to the at least one processor. In aspects, the at least one processor may be configured to monitor activity by a plurality of users, and to compile a plurality of data sets based on the monitoring. In aspects, each of the plurality of data sets may include information representative of the activity by the plurality of users. In aspects, the at least one processor may be configured to construct a network model based on one or more of the plurality of data sets. In aspects, the network model may be representative of at least a portion of the activity. The at least one processor may be configured to evaluate the network model against a set of rules to produce a plurality of outputs. In aspects, the plurality of outputs may include at least one of a set of classifications, a set of link metrics, and a set of communities. The at least one processor may also be configured to execute decision engine logic against the plurality of outputs to identify outlier network activity within the network. In aspects, the at least one processor may be configured to receive feedback regarding the identified outlier network activity. In aspects, the feedback may indicate whether the decision engine correctly identified network activity as outlier network activity. In aspects, the at least one processor may be configured to modify at least one of: the network model, the set of rules, and the decision engine logic in response to receiving feedback that indicates incorrectly identified outlier network activity.

In aspects, a non-transitory computer-readable medium storing instructions that, when executed by one or more processors, cause the one or more processors to perform operations for identifying outlier network activity is disclosed. In aspects, the operations include monitoring activity by a plurality of users, and compiling a plurality of data sets based on the monitoring. In aspects, each of the plurality data sets may include information representative of the network activity by the plurality of users. The operations may also include constructing a network model based on one or more of the plurality of data sets. In aspects, the network model may be representative of at least a portion of the activity by the plurality of users. The operations may also include evaluating the network model against a set of rules to produce a plurality of outputs. In aspects, the plurality of outputs may include at least one of: a set of classifications, a set of link metrics, and a set of communities. The operations may also include executing decision engine logic against the plurality of outputs to identify outlier network activity within the network.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted, it should be understood, of course, that this disclosure is not limited to the particular embodiments illustrated herein.

DETAILED DESCRIPTION

Figure 1:
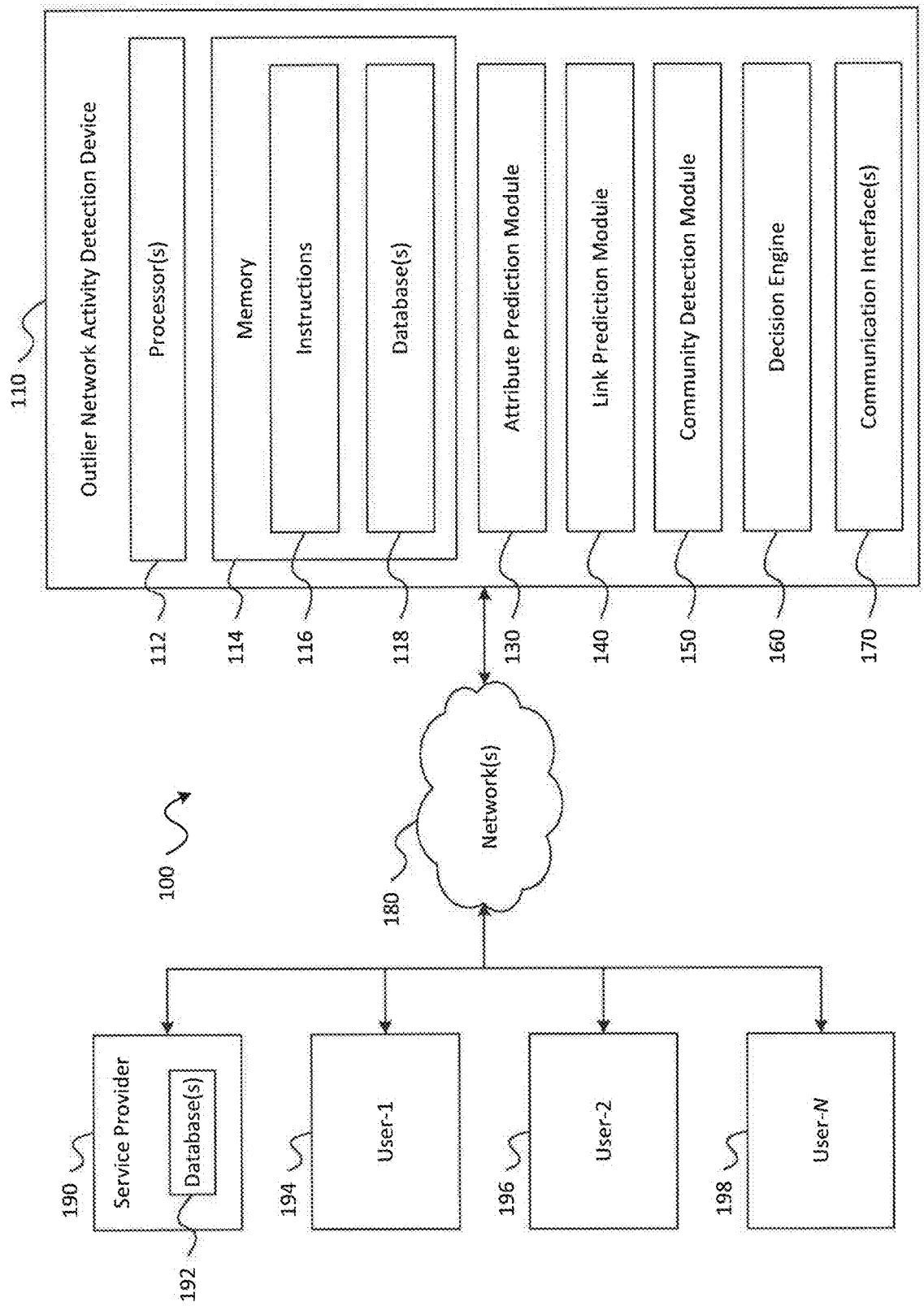
FIG. 1 is a block diagram illustrating aspects of a system for identifying outlier network activity in accordance with embodiments of the present disclosure.

Referring to FIG. 1, a block diagram illustrating aspects of a system for identifying outlier network activity in accordance with embodiments of the present disclosure is shown as a system 100. The system 100 provides an architectural framework that solves various technical challenges associated with the identification of outlier network activity. The architectural framework of the system 100 may be configured to: 1) categorize network activity based on behavioural similarities; 2) identify new cases of outlier network activity which would not have raised case otherwise; 3) identify outlier network activities that would represent new and emerging outlier network activity behavioural scenarios; and 4) execute various processes to mitigate risks posed by identified outlier network activity.

As shown in FIG. 1, the system 100 includes an outlier network activity detection device 110 (hereinafter referred to as "detection device 110"). The detection device 110 includes one or more processors 112, a memory 114, an attribute prediction module 130, a link prediction module 140, a community detection module 150, a decision engine 160, and one or more communication interfaces 170. It is noted that although shown in FIG. 1 as single a logical block, the detection device 110 may comprise a number of connected hardware and software components and/or devices that operate in a coordinated manner to perform the operations described herein with respect to the detection device 110. For example, the functionality of the detection device 110 described herein may be performed by a single server, by a plurality of servers, by a collection of network-accessible hardware and software resources (e.g., cloud resources), and the like.

In aspects, the memory 114 may include may read only memory (ROM) devices, random access memory (RAM) devices, one or more hard disk drives (HDDs), flash memory devices, solid state drives (SSDs), other devices configured to store data in a persistent or non-persistent state, or a combination of different memory devices. In aspects, the memory 114 may store instructions 116 that, when executed by the one or more processors 112, cause the one or more processors 112 to perform operations described in connection with the detection device 110 with reference to FIGS. 1-17. The instructions 116, when executed by the one or more processors 112, may also cause the one or more processors to perform operations for providing the functionality described in connection with the attribute prediction module 130, the link prediction module 140, the community detection module 150, the decision module 160, or a combination thereof.

The one or more communication interfaces 170 may be configured to communicatively couple the detection device 110 to one or more networks, such as a network 180, as shown in FIG. 1. The one or more communication interfaces 170 may communicatively couple the detection device 110 to the network 180 via wired and/or wireless communication links established according to one or more communication protocols or standards (e.g., the Ethernet protocol, TCP/IP, the IEEE 802.11 protocol, the IEEE 802.16 protocol, 4G/LTE and/or 5G/NR standards, etc.). In aspects, the network 180 may correspond to a network operated by a service provider 190 and may be used to facilitate the providing of services to a plurality of users, illustrated in FIG. 1 as a group of N users including a first user 194, a second user 196, and an n-th user 198.

The system 100 may be configured to leverage the power of existing data to provide a detailed view of network users via a variety of data points, such as network activity, user account information, demographic information, and the like. In aspects, the system 100 may be configured to monitor activity of the plurality of users and, based on the monitoring, the detection device 110 may compile one or more data sets that include information representative of the network activity by the plurality of users. It is noted that in this context, the term network refers to a network of users, rather than a communication or data network, such as is shown in FIG. 1 as network 180. It is also noted that the monitoring may be facilitated by a data or communication network, such as network 180, but that the monitored activity may be associated with interactions between the network of users, such as transactions in which the plurality of users are engaged, user account characteristics, service usage, or other user behaviors that may be observed by the detection device 110. In some aspects, the system 100 may not actively monitor the plurality of users, and may instead receive the one or more data sets including information representative of the network activity by the plurality of users from the service provider 190 via the network 180. As described in more detail below, through various techniques for analyzing and processing the one or more data sets, the system 100 may identify hidden, emerging and unknown outlier network activity behavioural patterns. Additionally, the system 100 may provide a user level monitoring model that integrates seamlessly with other data sources, such as existing sources of data associated with the service provider 190. Additionally, the system 100 may implement a self-learning feedback loop that utilizes results from previous analysis to refine the analytics processes and improve the accuracy of future analysis and processing of compiled data sets by the system 100.

It is noted that the detection device 110 and its functionality may be deployed in a variety of configurations. For example, the detection device 110 may be deployed as an integrated component of an overall communication system, such as a server deployed within a network operated by the service provider 190. In such an implementation, the server that provides functionality described with reference to the detection device 110 may be integrated with other systems of the network operated by the service provider 190, such as database systems, communication systems, security systems, and the like. This integration may provide the detection device 110 with access to relevant sources of information, such as providing access to databases that may be utilized to compile one or more data sets associated with activity by the plurality of users, and/or connect the detection device 110 to end user systems, which may allow the detection device 110 to provide alerts and other relevant information regarding identified outlier network activity to end users, as described in more detail below.

As another example, the detection device 110 may be deployed as a service that is provided to an entity, such as the service provider 190, by a third party (e.g., a service provider operating the detection device 110). In such an implementation, the service provider 190 may upload user data to the detection device 110, which is hosted by the third party. Functionality of the detection device 110 may be accessed, by the service provider 190, via a web page hosted by the third party, or may be provided via a thin client application executing on one or more devices of the information technology infrastructure of the service provider 190, where the thin client application operates in a client-server relationship with a server operated by the third party, in such an arrangement, the server may be configured to perform processing associated with outlier network activity analysis, modeling, and detection, as described in more detail below, and the thin client application may enable the service provider 190 to upload data to the detection device 110, and/or provide various interactive tools and interfaces to the service provider 190 for analyzing outlier network activity and other outputs generated by the server.

In the present disclosure, an outlier may be viewed as an entity, device, group, or individual who is detached or exhibits unique traits that are different from the general population or a subset of the general population. Outliers therefore present unique behaviour characteristics that can be detected and compared against the behaviours of other users. The disclosed outlier detection techniques allow the system 100 to detect new outliers through comparisons of the behaviour of members of a user population (or subset of the user population) to confirmed outliers within a situation specific context. By giving a situation specific context to what an outlier is, and recording their behaviour, the disclosed outlier network activity analysis techniques may be applied to a wide range of situations. In these situations, behaviour modeling may be performed using an ensemble of graph analytics techniques, described in more detail below, which may facilitate improved outlier detection and identification across a broad range of situations and use cases.

Cybersecurity is an example of one situation where the system 100 may be utilized to identify outlier network activity. In particular, the system 100 may solve technical challenges associated with detecting users that pose a threat to an entity's technology and network infrastructure. According to embodiments of the present disclosure, the system 100 may be utilized in a cybersecurity context to identify outlier network users, commonly referred to as hackers.

For example, in FIG. 1, the detection device 110 may be utilized to identify outlier network activity associated with threats to the cybersecurity of the service provider 190. In this example, the service provider 190 may provide one or more services to its subscribers, shown as the plurality of N users 194-198 in FIG. 1, via the network 180. The service provider 190 may maintain a database 192 of information associated with its subscribers and their use of the one or more services. To identify potential threats to the cybersecurity of the service provider 190, the information stored in the database 192 may be provided to the detection device 110. Based on the information received from the service provider 192, which may include information associated with known hackers (e.g., known outliers), the detection device 110 may create a profile for a hacker. Additionally, as described in more detail below, the detection device 110 may construct one or more network models based on the information received from the service provider 192, where the one or more models include information that conceptualizes or captures attributes (e.g., behaviors, interactions, relationships, activity, etc.) of the network users and their interactions with the one or more services. The detection device 110 may then evaluate one or more of the models against one or more rule sets (e.g., rule sets associated with the attribute prediction module 130, the link prediction module 140, and the community detection module 150) to identify behavioral similarities between the network users. As a result of the evaluation of the model(s), the detection device 110 may generate a set of outlier network activity predictions and may execute decision engine logic of the decision engine 160 against the set of predictions to identify one or more network users that exhibit behaviors similar to known outlier network users (e.g., hackers, malicious users, and the like). In embodiments, the evaluation of the model based on the one or more rules sets and the decision engine logic may identify new instances of outlier network users (e.g., new hackers) through identification of network users that exhibit attributes (e.g., behaviors, interactions, relationships, activity, etc.) similar to attributes of the known outlier network users.

After the detection device 110 identifies these potential cybersecurity threats, the detection device 110 may execute one or more processes to mitigate those threats. For example, the detection device 110 may disable or restrict access to the one or more services by the identified network users, disable one or more devices and/or accounts associated with the identified network users, or other threat mitigation processes. In some embodiments, rather than executing processes to mitigate the threats directly, the detection device 110 may provide information that identifies the outlier network users to a system of the service provider 190, and the service provider 190 may utilize the information provided by the detection device 110 to mitigate the identified threats.

As briefly described above, the detection device 110 may receive information from the service provider 190 and may use the received data to compile one or more data sets that include information representative of user activity conducted via the network 180. For example, where the network 180 is a financial network operated by a financial services provider, the one or more data sets may include information associated with accounts, transactions, demographics, and the like. As another example, where the network 180 is a telecommunications network operated by a telecommunications service provider, the one or more data sets may include information associated with service usage, account details, account activity, customer demographics, and the like. In yet another example, where the network 180 supports information technology and infrastructure for an entity, such as a business or service provider, the one or more data sets may include information regarding use of the network 180, such as information associated with use of services provided via the network 180, information associated with users of the network 180 (e.g., employees of the business or subscribers to the service), and the like.

In some aspects, the detection device 110 may retrieve the information used to compile the one or more data sets from a remote database, rather than receiving it from the service provider 190 or other entity. For example, the service provider 190 may maintain records associated with its user base at a database 192, and the database 192 may be accessible to the detection device 110 via the network 180. In such an implementation, the detection device 110 may be configured to periodically check the remote database 192 to determine whether any changes in the information stored therein have occurred since a last time that the detection device 110 retrieved the data. The detected device 110 may check for updated data once a week, once a month, once a quarter, once every six months, or some other time interval. In aspects, the time interval may be configurable. For example, the time interval may be short (e.g., once a week) for use cases where a large volume of data may be generated over a short period of time, such as in a financial network use case where users may conduct thousands or hundreds of thousands of transactions per week, and may be set to a longer period of time (e.g., once a month) for other use cases, such as in a telecommunications network use case where users are typically billed once per month. It is noted however that the particular time period for a single use case may change over time depending on the particular circumstances for which the detection device 110 is deployed. For example, the detection device 110 may retrieve data once a month for the first six months of a year and then may be reconfigured to retrieve data from the database once every two weeks for the next six months (e.g., due to an increased amount of data being generated, frequent changes in the data, etc.). Thus, as the need for updated data and/or the amount of data that is generated changes over time, the detection device 110 may be re-configured to retrieve data from the database 192 in a timely manner to ensure, that it is operating on the correct data sets.

The compiled data sets may be stored at a database. For example, as shown in FIG. 1, one or more databases 118 may be stored at the memory 114 of the detection device 110. It is noted that in aspects, the one or more databases 118 may be accessible to the detection device 110 via a network. For example, the memory 114 may include one or more network attached storage (NAS) devices that are accessible to the detection device 110, and the one or more databases 118 may be stored at the one or more NAS devices. The data sets compiled by the detection device 110 may contain thousands or even hundreds of thousands of records depending on the size and complexity of the use case for which analysis by the detection device is to be performed. Thus, storing the one or more compiled data sets at a remote database may provide for more efficient storage of the data sets. In aspects, the detection device 110 may be configured to retrieve one or more data sets from the database(s) during network outlier activity analysis conducted according to embodiments and store the retrieved one or more data sets in a local memory, such as local RAM devices, local HDDs, local Flash memory devices, and the like. This may enable the detection device 110 to perform operations on the one or more data sets more quickly.

In aspects, compiling the one or more data sets may include constructing an analytics data mart, which may be stored at the database 118. The analytics data mart may contain a series of indicators selected for characterizing users and network activity according to a particular use case. In the description that follows, aspects of establishing an analytics data mart for an anti-money laundering (AML) use case are described. It is noted that describing the analytics data mart with respect to an AML use case is provided for purposes of illustration, rather than by way of limitation, and in aspects, analytics data marts may be created and configured for use cases other than an AML use case.

Construction of the analytics data mart may facilitate the transformation of raw data, such as data derived from monitoring a network and/or data received or retrieved from the service provider 190, into a format that may be used at a later stage to construct network models in accordance with embodiments, as described in more detail below. In an AML context, understanding the typical activity and behavior of accounts and users may help identify and distinguish between normal and abnormal behaviors. During construction of the analytics data mart for the AML use case, a set of descriptive variables that captures the holistic behavior of each account and user may be defined and engineered to effectively capture the different scenarios commonly associated with money laundering. These common AML scenarios may include: 1) rapid movement of funds—accounts and/or customers that receive and send a lot of money in very short times may be abnormal as they appear to be intermediate money launderers; 2) structuring—accounts and/or customers that are sending or receiving many small transactions in a certain period that sum up to a big amount which exceeds the amount limit that may set by a financial institution or government entity for that specific period (e.g., day/week/month etc.). This appears like the accounts/customers are intentionally trying to avoid triggering the rules that are set by the bank to capture and monitor such activity; 3) exclusive recurring relationships—pairs of accounts and/or customers with a high volume or total amount of transactions can be abnormal since they may indicate a form of unauthorized business between the two parties; 4) hidden relationships—relationships between parties that do not seem to be transacting directly but for which there appears to be a consistent/unusual movement of funds from one account/customer to the other through different intermediary parties; 5) sudden change in transacting behavior—accounts and/or customers with a significant change their transaction patterns (i.e., in the frequency, volume and/or amount of transactions) which may indicate abnormal behavior if it is not properly justified (e.g., change of job/income); 6) unusual cash and monetary instrument activity (e.g., checks, investments, traveler's checks)—sending or receiving cash can be an anonymous way to enter money into the bank for laundering and extracting the clean money at the other end respectively, and these transactions may require a closer analysis to ensure that any abnormal activity is captured; and 7) high geographic, credit, or other risk—accounts and/or customers with high geographic risk (e.g., transacting in sanctioned countries), high credit risk (e.g., from external credit score organizations), or other types of risk may require closer monitoring as they may be prone to conducting money laundering.

In order to adhere to the AML scenarios described above, the data analyzed during model construction should contain details on the accounts' and customers' characteristics, as well as transactions data. Most current AML systems and technologies perform their monitoring at a transaction level. However, as described herein, the proposed solution moves a level above the transaction level and performs monitoring and analysis at an account or customer level. Therefore, the raw banking or financial transaction data may need to be converted into variables at: 1) the account level, for capturing the activity and characteristics of an account to determine abnormal behavior account level analysis may provide more granularity on the specific account transitioning behavior when compared to customer level; and/or 2) customer level, where account data is rolled up to detect abnormal behavior of customers customer level analysis may provide better aggregation of the cases at a higher level than transaction and account level and may also enable easier integration with other internal or external data sources.

Based on the AML principles described above, a list of key performance indicators (KPIs) may be created. From this list of KPIs, and based on the available data, some of these KPIs may be directly available from the received/retrieved data sets and some may need to be engineered using different variables in the received/retrieved data sets. For example, KPIs like customer location may be directly available from the raw data of the received/retrieved data sets. However, for other KPIs, such as transactions executed in the last month, the date of the transactions of an account may need to be investigated to calculate the correct sum for the total amount of transactions within a specific timeframe.

To facilitate account level monitoring, a set of variables for graph generation may be sorted into one of three categories: 1) account specific details; 2) transaction characteristics that are aggregated to summarize the activity of the account; and 3) customer characteristics that provide information regarding the primary account holder. Once this set of variables has been created, and the appropriate data sets have been compiled, this information may be used by the detection device 110 to construct a graph of user activity at the account level.

To facilitate customer level monitoring, a set of variables for graph generation may be sorted into one of three categories: 1) customer specific details; 2) account specific characteristics that provide aggregated information regarding all the accounts that the customer holds as a primary or secondary owner; and 3) transaction characteristics that are aggregated to summarize the activity of each account that is held by the customer. Once this set of variables has been created, and the appropriate data sets have been compiled, this information may be used by the detection device 110 to construct a graph of user activity at a customer level.

In aspects, various schemas may be used to compile the one or more data sets. A landing layer schema may serve as a database schema for uploading a financial institution's raw data into the database 118. The landing layer schema may not apply any data modifications or aggregations; however, landing layer script(s) used for uploading the data to the database 118 may be configured to ensure that the uploading of the raw data is successfully completed. In aspects, an intermediate layer schema may be used to transform the raw data into first level aggregation variables. These variables may then be used to construct one or more presentation layer tables, described in more detail below. In aspects, the various analytics algorithms may not have any visibility of the data in the intermediate layer.

A presentation layer schema may be used to provide the analytics algorithms, such as the algorithms implemented by the attribute prediction module 130, the link prediction module 140, the community detection module 150, and the decision engine 160, with access to the data stored at the database 118. The presentation layer may include two tables that summarize the available account level and customer level variables, which are ready for consumption by the analytics algorithms.

In aspects, the transformation of the raw data into meaningful aggregated variables may involve data roll up operations. The data roll up operations may be performed first from transaction level to account level and then from both transaction and account level to customer level, in aspects, the order in which the data roll up is performed may be critical, since it may ultimately affect the precision and accuracy of the final constructed variables that are going to be fed into the analytics algorithms. Possible roll up operations that may be performed to construct account level variables from transaction level data may include aggregation roll up operations (e.g., sum, average, median, min, max, percentile, ration, proportion, Fano factor: variance divided by mean (used for burstiness), etc.); lookback period roll up operations (e.g., day, week, month, quarter, annual, etc.); and threshold definition roll up operations (e.g., maximum daily amount, maximum daily number of transactions, maximum allowed geographic, credit or transaction risk, round amount definition (round to nearest 100, 1000, and the like)). It is noted that the exemplary roll up operations described above have been provided for purposes of illustration, rather than by way of limitation. For example, in addition to exemplary roll up operations described above, additional roll up operations that may be used to construct customer level variables from account level data and variables and vice versa may include: account level roll up for customer variables (aggregation for the primary account owner, aggregation for all secondary account owners, aggregation for all customers that are listed as owners of the account, etc.); customer level roll up for account variables (aggregation for all accounts for which the customer is the primary account holder, aggregation for all accounts for which the customer is a secondary account holder, aggregation for all accounts for pairs of customers that have the highest proportion of transactions between them, aggregation for all accounts, etc.), and other operations not described here to simplify the present disclosure.

In aspects, presentation tables (e.g., the data within the database 118 that is used to construct the network models and that is used by the attribute prediction module 130, the link prediction module 140, the community detection module 150, and the decision engine 160) may be formatted so that they are ready to be consumed directly by the analytics algorithms. In this manner, the construction of the network model(s) and/or the analytics performed on the network model(s) by the modules 130-150 and the decision engine 160 may be completed more rapidly (e.g., because no data conversion and/or formatting needs to be performed). Accordingly, in aspects, the presentation tables may be required to not have any missing values.

In aspects, clean up and imputation operations may be used to validate that the presentation layer tables do not contain any missing values. These operations may include: replacing missing Null and NA values (e.g., replace missing values with 0 or average values for numerical variables; replace missing values with mode for categorical variables; if it makes sense and a missing value adds information, then keep NA as an optional category for categorical variables); replace invalid values (e.g., replace negative values with either 0 or average value for numerical variables); contain categorical variables (e.g., include the highest frequency categories that represent up to 85% of the rows); transform geographical variables (e.g., if a categorical variable is specified at a city or country level convert to a continent level; if closeness between different geographies is desirable, the geographical variable may be converted into longitude and latitude); and/or other operations to validate that the presentation layer tables do not contain any missing values, it is noted that the exemplary operations described above have been provided for purposes of illustration, rather than by way of limitation, and that in some aspects the detection device 110 may be configured to utilize other techniques to format the data included in the presentation layer tables. In aspects, once the received/retrieved data sets have been compiled and null/missing values have been corrected, the compiled data sets may be ready for use to perform modeling and analysis in connection with identifying outlier network activity in accordance with embodiments of the present disclosure.

In aspects, the detection device 110 may be configured to construct a network model representative of at least a portion of the network activity based on at least one of the one or more compiled data sets. As noted above, network activity may include user network activities performed on a physical network, such as transactions executed across a financial network or service usage in a telecommunications network, but may also include user activities that do not require use of a communication-type network, such as a plurality of insureds making insurance claims. Thus, whether a physical communication network is utilized or not, the important aspect of constructing the network model based on the user network activities is the relationships that those activities create between the various users and/or the service provider, and the insights those activities provide into user behaviors.

In aspects, constructing the network model may include constructing at least one graph of the network activity. The detection device 110 may be configured to identify a set of features associated with a model use case corresponding to target outlier activity within the network. The model use case may be associated with a scenario for which outlier network activity is to be detected. For example, the detection device 110 may be configured to identify outlier network activity across a plurality of different use cases, such as the various use cases described above involving financial service providers, telecommunications service provider, business infrastructure security, insurance claims, and the like.

The set of features used to construct the graph may be identified by the detection device 110 based on a model use case. For example, a first set of features may be identified for a first use case and a second set of features may be identified for a second use case. In aspects, the detection device 110 may provide one or more graphical user interfaces that enable an end user of the system 100 to specify the model use case for a particular application of the detection device 110. For example, a user may specify that the detection device 110 is to perform outlier network activity analysis on one or more data sets to identify outlier network activity for a cybersecurity use case. Additionally, in aspects, the user may specify a frequency for performing the outlier network activity analysis. For example, the user may specify that the detection device 110 is to perform the outlier network activity analysis every day, week, month, or some other time schedule.

In some aspects, the detection device 110 may be dedicated to performing outlier network activity detection for a single use case (e.g., identifying one type of outlier network activity, such as identifying a specific type of hacker), and in such aspects, the user may simply provide inputs to configure the frequency at which the detection device 110 performs the outlier network activity analysis. For example, the detection device 110 may be operated by a service provider (e.g., a financial services provider, an insurance carrier, a telecommunications service provider, and the like) and may be configured to identify outlier network activity corresponding to one or more use cases specific to the service provider that operates the detection device.

As explained above, traditional approaches to outlier network activity identification treat customers as isolated entities. In contrast, the detection device 110 utilizes a graph-centric approach to model and explore interactions among a network or group of customers by evaluating their holistic behavior. The one or more data sets may include raw relational data, and the detection device 110 may be configured to convert the raw relational data into a graph structure based on the set of features. For example, the set of features may include attributes that have been selected based on an analysis of the particular use case for which the outlier network activity is being performed. The attributes may be selected based on a set of KPIs for a particular use case. For example, a set of KPIs for use in an AML use case may include attributes associated with one or more data sets that include customer information, transaction information, and accounts data, which may be retrieved from, or provided by a financial services entity, as described above. In aspects, the set of features may be used to generate edges of the graph.

In some aspects, the set of KPIs may be selected in an iterative fashion. To illustrate, in an exemplary implementation, 115 KPIs were analyzed to identify important features, and those features were then selected for edge generation. A random forest algorithm was used to calculate feature importance. For example, a model may be initially trained on all variables, and then a mean decrease impurity method and a Gini threshold may be used with a Gini indicator to filter the important features. Gini importance measures the average gain of purity by splits of a given variable. If a variable is useful, it tends to split mixed labeled nodes into pure single class nodes. Splitting by a permuted variable tends to neither increase nor decrease node purities. Permuting a useful variable tends to give a relatively large decrease in mean Gini gain. The Gini threshold may be set to a particular value, and important features may be identified as features that have importance scores over the Gini threshold. For example, in the exemplary scenario above, the Gini threshold was set at 0.1 and the features that had importance scores over the Gini threshold were finally chosen. Of the 115 features evaluated, 22 (21 numerical, 1 categorical) features exhibited superior Gini scores, and those 22 features may be selected by the detection device 110 to construct one or more graphs.

It is noted that in addition to using a Gini impurity analysis, as described above, in aspects, the detection device 110 may be configured to utilize other approaches to identify the most relevant features for edge generation. For example, in aspects, the set of features used to construct the graph may be obtained through extraction of components using Principal Component Analysis (PCA). PCA finds a set of d orthogonal basis vectors that maximally capture the relationship between the original dimensions. With PCA there may be a trade-off between the explaining the maximum variation from the extracted components and the reduction from the original dimension. To validate use of PCA for identifying the set of features, a PCA analysis was carried out on all 115 of the KPIs referenced above, and the amount of cumulative variation explained by the components was used to select the appropriate number of extracted components from these variables. This means that the n components explain X % of the variation from the original dimensions. During validation of the use of PCA, the components that explained 90% of the variation in the original dimensions were used as an alternative route for graph generation. Both of the aforementioned methodologies were found to reduce the feature space and either one allows generation of a graph that may serve as a foundation for further processing by the detection device 110 for identification of outlier network activity, as described in more detail below.

Once the set of features has been selected, the detection device 110 may generate an association matrix based on relational data included in the one or more data sets and the set of features. In aspects, the detection device 110 may convert relational data included in the one or more data sets into the association matrix, which may establish interrelationships between different network users. The graph may include a plurality of nodes and a plurality of edges, where each of the plurality of nodes may correspond to one of the plurality of network users and each of the plurality of edges may connect two nodes of the plurality of nodes. In other words, the graph may include a plurality of edges between nodes, and the edges may correspond to connections or relationships between the various network users. In aspects, constructing the graph based on the association matrix may include applying edge weights to the plurality of edges of the graph, where edge weights are representative of an association strength between two connected nodes.

In aspects, the detection device 110 may generate the association matrix based on the set of selected features. For example, the one or more data sets may include relational data, and the detection device 110 may construct a relational table at a network user level based on the set of selected features. The detection device 110 may be configured to perform a set of operations to transform and scale the dataset. This may allow for standardization of the input features and remove measurement unit dependencies. Standardization of the data may allow for quicker convergence and facilitate analysis of the data in accordance with embodiments.

In aspects, once the association matrix is constructed, a Dimension Independent Matrix Square using MapReduce (DIMSUM) method may be implemented, which is an algorithm that will try to find similarities between a pair of vectors. This algorithm may reduce processing times for batch jobs by approximately 40%. A cosine similarities rule may then be used to calculate similarities between two vectors. The computational power to find similarities for millions of vectors may be very high. A user-defined threshold may be used to focus on the stronger similar pairs and reduce the computational complexity of this process. Various defined thresholds were tested, and it was found that setting the threshold to 0.6 provided satisfactory results while showing enough edges between agents. It is noted, however, that the specific threshold value is provided for purposes of illustration, rather than by way of limitation.

When constructing the association table (or matrix) that is to be used for graph generation, it may be important to consider the selection of neighbors, since only the significant values need to be included. In an effort to reduce the dimensionality and computational complexity of the association matrix, constraints on the selection of nearest neighbors may be applied to the association matrix to limit the neighborhood (e.g., to limit the number of neighbor nodes to which each node is connected). In aspects, the detection device 110 may be configured to apply a set of pruning rules to the graph to produce a reduced complexity graph. In aspects, the set of pruning rules may be configured to remove at least one of nodes and edges from the graph.

In aspects, the detection device 110 may be configured to prune the graph using a first pruning rule. The first pruning rule may specify that only the top-N nearest neighbors for each user are to be retained within the graph. For example, the first pruning rule may be configured to, for each node, keep only the N nearest neighbors with respect to a similarity measure. Each vertices' neighbor may have particular rank, and the first pruning rule may retain the top-N ranked neighbors and filter (or remove) all neighbors whose rank is lower than N. In aspects, the particular ranks may be determined using a row_number( ) function, such as the row_number( ) function of the Spark SQL stack. In aspects, N may be 30. In aspects, N may be greater than or less than 30.

In an aspect, the detection device 110 may be configured to prune the graph using a second pruning rule. Unlike the first pruning rule, which keeps a fixed number of nearest neighbors, the second pruning rule may be a threshold based pruning rule configured to keep all neighbors with a similarity weight having a magnitude larger than a threshold (e.g., a threshold that which neighbors are to be kept). For example, the magnitude of similarity weight between nodes may be calculated via cosine similarity between vectors that represent KPI's (characteristics) of each user, which may be expressed as:

$$sim = \cos(\theta) = \frac{A \cdot B}{\|A\|\|B\|}, \qquad \text{Equation 1}$$

where A is a vector representing characteristics of a first user and B is a vector representing characteristics of a second user, $\|A\|$ represents the magnitude of the vector A, $\|B\|$ represents the magnitude of the vector B, and $\cos(\theta)$ represents a measure of similarity (sim) between the vectors A and B. For example, if out of 5 KPIs, two users have the same value for one, different values for 2 others, and zero elsewhere, then the weight may be 0.33. Once similarity weights are calculated and pruning rules have been applied (e.g., the strong links are kept and the rest are treated as noise), the association matrix may be normalized to get all data points into the same value range. A DIMSUM algorithm may be applied to reduce computational costs.

In aspects, the detection device 110 may be configured to prune the graph using only the first pruning rule or only the second pruning rule. In aspects, the detection device 110 may be configured to prune the graph using both the first pruning and the second pruning rules. Several threshold values (e.g., 0.0, 0.1, 0.2, . . . , 0.9, 0.95) for the second threshold were tested, and it was found that the optimal combination, for at least the tested data sets, was achieved using N=30 for the first pruning rule and a 0.0 threshold value for the second pruning rule. It is noted, however, that the specific threshold values have been provided for purposes of illustration, rather than by way of limitation.

As described below, modeling the one or more data sets using graphs in accordance with the present disclosure may provide improved visualization of the network activity. For example, graphs constructed by the detection device 110 may be used to provide interactive visualization tools that allow network activity to be viewed as a function of behaviors and relationships, as described in more detail below and as illustrated in FIGS. 2-16. Additionally, graph-centric outlier network activity analysis according to the present disclosure examines the structure of interactions within a group or network of users to uncover hidden patterns between users within the group. As described in more detail below, the detection device 110 may leverage these interactions and behaviors identify outlier network activity.

Once the network model, such as the graph described above, has been constructed, the detection device 110 may be configured to evaluate the network model against a set of rules. As described in more detail below, the evaluation of the network model against the set of rules may produce a plurality of outputs, which may include at least one of a set of classifications, a set of link metrics, and a set of communities, and the detection device 110 may be configured to identify outlier network activity based on the plurality of outputs.

Evaluating the network model against the set of rules may be performed, at least in part, by the attribute prediction module 130. In aspects, the attribute prediction module 130 may be configured to compute a score that indicates whether a node is exposed to outliers within the network (e.g., whether the node is connected to, proximate to, or related to an outlier node in some manner), and the score may indicate that those outliers may have influence over the node(s). In aspects, the attribute prediction module 130 may be configured to evaluate the network model against a set of one or more attribute prediction rules, and as a result of the evaluating, the attribute prediction module 130 may produce a set of classifications that classify the nodes (e.g., the users) as outliers (or as exhibiting behaviors similar to outliers) or non-outliers.

In aspects, evaluating the network model against the one or more attribute prediction rules may include analyzing characteristics of connections between different ones of the plurality of nodes. In aspects, the attribute prediction module 130 may analyze the connections between different ones of the plurality of nodes by considering activities and customer behavior information within the network model and also by analyzing associations between users (e.g., nodes) and neighbors, which may facilitate an abnormal-by-association analysis. In aspects, the attribute prediction module may be configured to determine a set of node rankings based on the analyzing and then assign each node of the plurality of nodes to one of a plurality of classes based on the set of node rankings. For example, given a semi-labeled network model with few labeled legitimate and abnormal nodes and many unknown nodes, the attribute prediction module 130 may use a collective inference procedure to infer a set of class labels and scores for the unknown nodes by taking into account the fact that inferences about nodes can mutually affect one another. It is appreciated that in addition to accounting for user activity and connections between the different users and their activities, in some embodiments, the detection device 110 may account for other types of information, such as information associated with the underlying devices utilized by the users to engage in the various activities. For example, the detection device 110 may analyze or account for information associated with the types of devices that the plurality of users utilize to conduct their activities, the locations of those devices, the capabilities of those devices, and the like.

The attribute prediction module 130 provides for improved functionality over other outlier prediction methods by increasing "true positives" and reducing "false positives" via collective inference algorithms implemented by the set of one or more attribute prediction rules. In aspects, these algorithms may include at least one of: a PageRank algorithm, a Gibbs sampling algorithm, an iterative classification algorithm, a relaxation labeling algorithm, and a loopy belief propagation algorithm. Each of these algorithms may operate in such a manner that the whole network may be simultaneously updated during the analysis, which increases the speed at which the analysis may be performed.

As an illustrative example, the PageRank algorithm was initially developed as a way to determine the order in which web pages are displayed in response to a search by a user. The main idea behind the PageRank algorithm is that important web pages (i.e., web pages that appear at the top of the search results) have many incoming links from other (important) web pages. The PageRank algorithm can be seen as an algorithm for determining a propagation of page influence. The attribute prediction module 130 may implement a form of the PageRank algorithm that has been adapted to enable its use for outlier detection analysis. For example, the attribute prediction module 130 may be configured to evaluate the network model against a set of attribute prediction rules configured to identify outlier network activity by identifying nodes that are likely to become outliers, such as nodes that have strong association links to other validated outliers.

In aspects, after the graph is generated, the attribute prediction module 130 may analyze each node's importance using one or more rules for implementing the adapted PageRank algorithm of embodiments, which may be configured to analyze propagation of outlier behavior through the network model. During the analysis, the ranking of each node may be personalized around outlier detection by introducing known vertices into the algorithm. For example, instead of web pages, an association matrix A (e.g., the association matrix generated above) may represent an abnormal network (e.g., a user-to-user network). A personalized PageRank may solved through iteration according to:

$$r^n = \alpha \times A \times r^{n-1} + (1-\alpha) \times e, \quad \text{Equation 2}$$

Where $r^n$ is a vector of outlier node rankings after k iterations, with $r^0$ being a random vector with vector values between [0,1]; A is the association matrix; r is a vector containing outlier rankings for each node; e is a restart vector; and $\alpha$ is a restart factor that assesses how likely a user is to follow an abnormal behavior. In aspects, $\alpha$ may be set to a value of 0.85. Outlier detection methods infer a labeled graph (i.e., it is known which nodes are abnormal). In aspects, the attribute prediction module 130 may be configured to inject outlier nodes into the network model. The outlier nodes may be injected into the network model through a restart vector. For example, the i-th entry of vector e in Equation 2 may be 1 if the i-th node is abnormal and 0 otherwise. In aspects, the outliers may be injected into the network based on information associated with known outliers, such as through creation of outlier profiles created during compilation of the one or more data sets, as described above. Higher node rankings may indicate that a node is more susceptible to being influenced by outliers compared to the other nodes (e.g., nodes with lower node rankings). The final ranking assigned to each node may be interpreted as a ranking and not as a score. Since the top-ranked nodes are the most influenced by outliers, the process described above may enable the attribute prediction module 130 to identify the nodes within the network model that most closely resemble outlier nodes based on their personalized page rank (PPR).

The attribute prediction module 130 may be configured to assign each node to one of a plurality of classes based on the node rankings. For example, a first classification may be applied to nodes suspected of, or exhibiting qualities or behaviors similar to, outlier network activity, and a second classification may be applied to nodes that are not suspected of; and do not exhibit qualities or behaviors similar to, outlier network activity. The attribute prediction module 130 may be configured to implement attribute prediction rules configured to assign each node to a class based on the rankings. Different methodologies may be utilized to assign each node to a class. A training data set may be used to initialize one or more of these methodologies. For example, the training data set may be partitioned into two classes (e.g., a class associated with outlier network activity and a class associated with non-outlier network activity), and, for each class, a class mean or center for the two classes may be derived. Then these mean values may be used to classify each node for which a PPR was determined.

In an aspect, a Euclidian distance technique may be used to compute, based on each node's PPR, whether the node is closer to the first class (e.g., closer to the center or mean for the first class) or the second class (e.g., closer to the center or mean for the second class) and assign the node to the corresponding class to which the node is closer. The validation data set may use the centers from training data in order to reveal whether a node is abnormal or not.

In another aspect, a dichotomization rule may be used to classify the nodes. For example, a classification threshold may be calculated by adding the mean of class_0 and the standard deviation of class_0, and then nodes having PPR scores below the classification threshold may be assigned a zero ranking (e.g., a ranking associated with one of the classes) and all other nodes may be assigned a 1 ranking (e.g., ranking associated with the other class). A zero ranking may indicate that a node is in a class associated with non-outlier activity and a 1 ranking may indicate that a node is in a class associated with outlier activity, or vice versa.

As shown above, the attribute prediction module 130 evaluates the network model against one or more attribute prediction rules to produce a set of classifications. The set of classifications may classify the nodes (e.g., the users) as outliers (or as exhibiting behaviors similar to outliers) or non-outliers. As described in more detail below, the set of classifications may be provided to the decision engine 160, where it may be used by the decision engine 168 to identify outlier network activity, as described in more detail below.

In aspects, evaluating the network model against the set of rules may be performed, at least in part, by the link prediction module 140. The link prediction module 140 may be configured to determine influencers in the network by calculating centrality scores that indicate a strength of connections between the nodes of the network model. The link prediction module 140 may be configured to evaluate the network model against a set of one or more link prediction rules, and as a result of the evaluating, the link prediction module 140 may produce a set of link metrics that indicate a strength of connections between the nodes.

Link prediction may include calculating various network measures that help identify and understand the dynamics of abnormal network behavior and provide insights during outlier network activity analysis. In aspects, evaluating the network model against the one or more link prediction rules may include determining a set of link metrics based on one or more network measures, such as degrees, triangles, shortest path, Eigenvectors, and the like. For example, evaluating the network model against the one or more link prediction rules may include at least one of: calculating a degree metric for each node of the plurality of nodes; identifying triangle metrics associated with the network model; and computing shortest path metrics for the plurality of nodes. The degree metric may indicate a number of neighbors that a particular node has. The link prediction module 140 may be configured to distinguish between the number of outlier and legitimate neighbors that a node has. The triangle metrics may identify triangles, which are subgraphs that consists of three nodes that are all connected to each other, within the network identifying triangles facilitates an investigation into the influential effect of closely connected groups of individuals or nodes within the network. The shortest path metrics may indicate a minimum distance needed to reach each node from one or more other nodes. In outlier detection analysis, information about how far any node in the network is removed from the target node may provide meaningful information that contributes to outlier network activity identification and analysis. For example, if a node is close to a neighborhood of outlier activity, that outlier behavior might impact that node more intensively and contaminate the target of interest.

Evaluating the network model against the one or more link prediction rules may also include calculating a centrality score for each node based on the degree metrics, the triangle metrics, and the shortest path metrics, and the set of link metrics may include a set of centrality scores calculated for each node. The set of centrality scores indicates a strength of connections between the nodes. This set of scores may provide a single metric that accounts for and aggregates information that is contained within a network structure, such as the various different metrics described above, and may make a differentiation in the destination of outgoing links or the origin of incoming links to known abnormal nodes. The set of scores may also reveal weak and strong connections among key nodes of the network, as well as strong associations, indicated by a higher number of connections, which are characterized by frequent interaction, feelings of closeness, and multiple types of relationships, each of which may be captured by one or more of the network measures described above.

As shown above, the link prediction module 140 evaluates the network model against one or more link prediction rules to produce a set of link metrics that quantify the importance of an individual in the network based on a strength of connections between the nodes. It is noted that the exemplary metrics described above are provided for purposes of illustration, rather than by way of limitation, and that other metrics and measures may be utilized by the link prediction module 140 to generate the link metrics according to embodiments. The set of link metrics may be provided to the decision engine 160 where it may be used by the decision engine 160 to identify outlier network activity, as described in more detail below.

In the previously described evaluations of the network model (e.g., by the attribute prediction module 130 and the link prediction module 140) neighboring nodes were treated as separate entities and the relationships among the neighborhoods were at least somewhat neglected. While analysis of these individual relationships might uncover many interesting flows of influence through individuals, groups of nodes in the network might have a higher impact in terms of information exchange, such as the tendency of a node to become an outlier. In the present disclosure, graph analysis may be performed to identify communities of users (and/or associated devices), which are subgraphs within the network with a higher number and more intensive relationships among the members of the community than a random other subgraph in the network. The analysis or mining of communities in a network captures the effect of peer pressure. In an abnormal environment, peer pressure can strengthen the tendency to exhibit outlier behavior, and performing community mining in accordance with embodiments may allow groups of abnormal nodes within the network to be identified as communities or subgraphs in which outlier behavior occurs with a higher probability than in the rest of the graph. Analyzing communities in accordance with aspects of the present disclosure may identify which users are more likely to exhibit outlier behaviors due to influence by a whole community rather than only one individual.

To facilitate community analysis, the network model may be evaluated against the set of rules, at least in part, by the community detection module 150. The community detection module 150 may be configured to find groups of closely connected nodes, referred to herein as communities, in the network model. The analysis of communities captures the effect of peer pressure which may strengthen the tendency to drive abnormal behaviors. The communities may be identified within the network model by through graph partitioning. The community detection module 150 may be configured to evaluate the network model against a set of one or more community detection rules configured to analyze connections between the plurality of nodes and to identify a plurality of subgroups within the plurality of nodes. Each subgroup may correspond to a community of closely connected nodes identified within the network model.

The community detection module 150 may be configured to implement one or more techniques for performing graph partitioning in order to split the whole graph (or network model) into a predetermined number of groups. Exemplary algorithms that may be implemented by the community detection module 150 to identify communities within the network model through graph partitioning include: label propagation algorithms, Kernighan-Lin algorithms, hierarchical clustering algorithms, Girvan-Newman algorithms, modularity optimization algorithms, and clique percolation algorithms.

To illustrate an exemplary technique for community detection in accordance with aspects of the present disclosure, community detection using a label propagation algorithm is described below. It is noted however, that this example is provided for purposes of illustration, rather than by way of limitation, and the community detection module 150 may be configured to utilize any of the aforementioned graph partitioning techniques in accordance with aspects of embodiments. The label propagation algorithm is a community detection algorithm for graphs which aims to put together densely connected nodes under a common label (that contains similar information). One benefit of using label propagation algorithms is that they are computationally quick. However, it is noted that use of label propagation techniques does not guarantee convergence.

Identifying communities using label propagation algorithms seeks to: 1) find the community of a given node, which is also referred as the "neighborhood formation;" and 2) quantify the type of the given community (e.g., whether a community is associated with outlier activity or not). In aspects, the community detection module 150 may find the community of a given node by assigning a relevance score to every node, where "closer" nodes to known outliers have higher scores. As an example, PPR scores, which can help to identify neighborhoods but also differentiate the neighbors, may be used to score the nodes. Association edges for the label propagation algorithm may be calculated based on similarities of vectors of relational PPR scores, not from the original graph edges. This may boost the prediction performance of the label propagation algorithm. Once the relevance scores are calculated for each node, the neighborhoods may be determined based on the assigned relevance scores. The effect of peer pressure may be exploited by seeking for known abnormal cases among the members of a community, and, hence, if a known case of outlier activity is found to reside within a community, then all underlying nodes with high scores have neighbors with high pairwise proximity to each other.

During evaluation of label propagation algorithm prediction approaches according to embodiments, there were a few cases detected when a community consisting of only one node were observed. For those single node communities, label predictions may be transferred from original PPR predictions. Table 1, below, summarizes the evaluation of the label propagation algorithm predictions:

TABLE 1

|  | LPA |
|---|---|
| Accuracy | 0.76 |
| Precision | 0.71 |

TABLE 1-continued

| | LPA |
|---|---|
| Recall | 0.48 |
| F1 | 0.57 |

In Table 1, above, four metrics used to evaluate the use of the label propagation algorithm are shown. Those four metrics include: accuracy, precision, recall, and F1. The accuracy metric represents the ratio of correctly predicted outlier entities over the total number of outlier entities. The precision metric represents the ratio of correctly predicted outlier entities to the total predicted outlier entities. The recall metric represents the ratio of correctly predicted outlier entities to all entities in an actual class. The F1 metric represents the harmonic mean of precision and recall. As shown in Table 1, above, the accuracy of the label propagation algorithm was 0.76 on the particular dataset used for the evaluation, which demonstrates that the label propagation algorithm is suitable for use in identifying outlier network activity in accordance with embodiments and an effective compliment to the decision engine.

As shown above, the community detection module 150 evaluates the network model against one or more community detection rules to produce a set of communities. The set of communities may identify groups of densely connected nodes (e.g., users) as outliers (or as exhibiting behaviors similar to outliers) or non-outliers. The set of communities may be provided to the decision engine 160, where it may be used by the decision engine 160 to identify outlier network activity, as described in more detail below.

As described above with respect to the attribute prediction module 130, the link prediction module 140, and the community detection module 150, the network model may be evaluated against a set of rules to produce a set of outputs that includes at least one of: the set of classifications, the set of link metrics, and the set of communities. The decision engine 160 may be configured to receive the set of outputs, and identify outlier network activity based on the set of outputs. For example, the decision engine 160 may include decision engine logic that is executed against the set of outputs to identify outlier network activity within the network.

Executing the decision engine logic against the set of outputs to identify outlier network activity within the network may include processing each output included in the set of outputs to produce a set of outlier network activity predictions and then identifying the outlier network activity based on the set of outlier network activity predictions. In aspects, each of the outputs may be evaluated, and during the evaluation, the outputs may be interpreted to predict whether the outputs indicate that certain nodes of the network are associated with outlier network activity and/or are exhibiting outlier behaviors. The decision engine 160 may predict suspected outlier network activity based on the evaluation of each of the outputs to produce the set of outlier network activity predictions. At this point, the set of outlier network activity predictions may indicate whether particular nodes have been predicted to be associated with outlier network activity for each output included in the set of outputs. For example, where the set of outputs includes a set of classifications, a set of link metrics, and a set of communities, the set of outlier network activity predictions may include three predictions for each node. For a particular node, each of the three predictions may indicate whether the particular node is suspected of being associated with outlier network activity, and each of the three different predictions may be based on a different one of the outputs (e.g., a first prediction for the particular node based on the set of classifications, a second prediction for the particular node based on the set of link metrics, and a third prediction for the particular node based on the set of communities).

The decision engine 160 may be configured to identify outlier network activity based on the set of outlier network activity predictions. In aspects, the decision engine logic of the decision engine 160 may be configured to implement a voting algorithm or scheme that may be used to identify outlier network activity based on the set of outlier network activity predictions, where each prediction in the set of outlier network activity predictions may correspond to a vote that indicates whether particular network activity or a particular network node is suspected of outlier network activity. For example, the decision engine 160 may apply the voting scheme to the set of outlier network activity predictions, and the voting scheme may be configured to calculate a first number of votes and a second number of votes, the first number of votes corresponding to votes that indicate particular network activity is outlier network activity and the second number of votes corresponding to votes that indicate the particular network activity is not outlier network activity. In the example above, where the set of outlier network activity predictions includes three predictions for each node, if two of the predictions correspond to votes that indicate the particular network activity is not outlier network activity and the third prediction corresponds to a vote that indicates the particular network activity is outlier network activity, the decision engine logic may not identify the particular node as being associated with or exhibiting behaviors similar to outlier network activity. However, if two of the predictions correspond to votes that indicate the particular network activity is outlier network activity and the third prediction corresponds to a vote that indicates the particular network activity is not outlier network activity, the decision engine logic may identify the particular node as being associated with or exhibiting behaviors similar to outlier network activity.

In aspects, the decision engine logic of the decision engine 160 may be configured to utilize a weighted voting scheme. For example, some of the underlying modeling and analysis techniques may be more accurate than others with respect to identifying outlier network activity. The particular models and analysis techniques considered to be more accurate may vary depending on the particular use cases for which the outlier network activity analysis is being performed (e.g., some models and analysis techniques may be more accurate when performing AML outlier network activity analysis while others may be more accurate when performing claims fraud outlier network activity analysis). In such instances, the weighted voting scheme may be configured to apply votes derived from the different outputs provided to the decision engine 160 in an uneven manner. For example, a prediction determined from a first output of the set of outputs may be counted as three votes while a prediction determined from a second output of the set of outputs may be counted as two or less votes.

In aspects, an optimization algorithm may be used to optimize the weights utilized in a weighted voting scheme. For example, optimization based weighting may be accomplished based on linear programming, where a cost function is formed based on an accuracy metric (e.g., accuracy, lift, precision/recall) which may be maximized. The resulting set of weights can then be adjusted through the solution's self-learning mechanism. For example, to maximize the accuracy, the decision engine 160 may be configured to define an optimization problem based on linear programming and then solve the optimization problem to produce an output that provides an optimal set of weights that may be used to combine the outcomes derived from the modules 130, 140, 150.

In an aspect, rather than, or in addition to, using a voting scheme (e.g., a standard or weighted voting scheme) to identify outlier network activity, the decision engine 160 may be configured to combine the set of outlier network activity predictions to form a final set of outlier network activity predictions and may then identify outlier network activity based on the final set of outlier network activity predictions. In aspects, the decision engine 160 may combine the set of outlier network activity predictions through a process known as stacking, which may utilize logistic regression. For example, the outcomes from the various graph analytics models (e.g., the outputs generated by the attribute prediction module 130, the link prediction module 140, and the community detection module 150) may be provided as inputs to a second-level learning algorithm, such as a logistic regression model, that may be trained to combine the model predictions optimally to form a final set of predictions.

Using the techniques above, the decision engine 160 may identify particular nodes and/or network activity that is suspected of being outlier network activity and may classify the nodes accordingly. For example, the decision engine 160 may classify nodes and/or network activity as outlier network activity or non-outlier network activity. Additionally, the decision engine 160 may be configured to generate one or more reports and/or other visualizations representative of the classified nodes and/or network activity. In aspects, these reports and/or visualizations may be printed or may be presented to a user via a graphical user interface provided by the detection device 110. Exemplary graphical user interfaces and interactive tools that may be provided by the detection device 110 are described in more detail below with reference to FIGS. 2-46.

In aspects, the decision engine 160 may be configured to implement self-learning techniques, whereby the decision engine 160 is provided feedback regarding prior final classifications of network nodes and/or activity as outlier and/or non-outlier network activity, and then the accuracy of those prior final classifications is used to improve future executions of the decision engine logic against one or more outputs. For example, the decision engine 160 may receive feedback regarding previously identified outlier network activity, and the feedback may indicate whether the decision engine 160 correctly identified/classified nodes and/or network activity as outlier network activity. The feedback may be generated and provided to the detection device as a result of an investigation performed by an employee of the entity that is operating the detection device 110. For example, as outlier network activity is identified, cases may be raised by the detection device 110 for investigation. The employee may investigate the flagged or raised case to determine whether it is actually outlier network activity or not and provide feedback associated with the results of the investigation to the detection device 110.

Based on the received feedback, the decision engine 160 may be configured to modify at least one of: the network model, the set of rules, and the decision engine logic in response to receiving feedback that indicates incorrectly identified outlier network activity. For example, where a node was incorrectly identified as being associated with outlier network activity, the decision engine 160 may update the model to indicate that this node is not associated with outlier network activity. In this manner, any impact (e.g., tainting of other nodes and/or network activity) caused by incorrectly identifying the node and/or network activity as being outlier network activity may be corrected and the result of that correction may propagate through the network model(s) during subsequent executions of outlier detection analysis. In this manner, the self-learning techniques implemented by the detection device 110 may automatically correct any incorrect classifications or labels of nodes similar to the incorrectly identified node. Additionally, the self-learning may enable the detection device 110 to identify new and emerging cases of outlier network activity. For example, as network users and behaviors change, those changes may be reflected in one or more of the various types of graph analysis performed by the detection device 110. If the emerging activity exhibits behaviors similar to other known cases of outlier activity, the nodes exhibiting that activity may gravitate towards outlier network nodes and/or outlier network activity during one or more stages of the graph analysis, causing that activity to be detected by the detection device 110 as outlier network activity.

The detection device 110 may be configured to present various interactive visualization tools that may enable the end user to investigate the flagged activity and determine whether that activity has been accurately identified as outlier network activity, as described in more detail below with reference to FIGS. 2-16. Additionally, the detection device 110 may include outlier network activity mitigation modules and processes designed to address suspected and/or confirmed outlier activity. For example, if a node is identified as being associated with outlier network activity, the detection device 110 may implement one or more processes to hinder the node (e.g., the user and/or devices associated with that user) from engaging in outlier network behaviors, such as disabling or restricting a user account, disabling or restricting the user's access to a network and/or network resource, disabling or restricting a device associated with the user, disabling or restricting access to a service by the user and/or a device of the user, and the like, in aspects, the detection device 110 may further initiate operations to reduce a likelihood that nodes associated with an outlier node engage in outlier behavior. For example, the detection device 110 may initiate communications with users that are associated with a node that has been identified as an outlier node, and those communications may be configured to extract information from those users (e.g., identity verification, etc.), which may facilitate a determination as to whether those associated nodes are also engaging in outlier network activity and/or limit those users' access to services and/or network resources until further evaluation has been completed.

It is noted that the system 100 may be configured to identify outlier network activity across a wide range of situations and industries. For example, a classic customer analytics problem involves detection of customer churn and understanding what causes customers to leave or stop using a designated service. This scenario may applicable to many different types of service providers, such as telecommunication service provider, television service providers, and the like. In these types of scenarios, the outlier may be a customer susceptible of leaving or defecting on a service. In accordance with embodiments, a service provider may record information regarding their customers' attributes, such as service usage, account details and activity, demographics; this information may be provided to the detection device 110 of the system 100. Based on this information, the detection device 110 may create a profile for a customer who has been lost and construct a network model of the service provider's customer base. The detection device 110 then uses the model to find other customers susceptible of defecting the service provider. Through such analysis, the organization can take measures to reconvert and/or prevent the loss of these customers.

In another exemplary scenario to which the system 100 may be applied, the finance and risk industries face many different types of problems associated with outlier network activity, including, but not limited to, fraud and anti-money laundering (AML). In these types of situations, an outlier may be a fraudster or a money launderer. Currently, a case of abnormal or outlier activity may be raised if a customer breaks a rule or exceeds a specific threshold (e.g., when an amount of money transferred by the customer in the last day exceeds a threshold amount of money). Entities operating in these industries, such as banks, may have data regarding previously identified outlier customers; however, this data is not used to detect new instances of outlier activity. In accordance with embodiments of the present disclosure, the detection device 110 may use the bank's existing customer data to construct a model of the bank's customers and their behaviors, including the behaviors of known outlier customers. As described above, the detection device 110 may use the model to identify other customers that exhibit behaviors and activity corresponding to the known outliers. These other customers may correspond to new outliers within the network.

In yet another exemplary situation to which the system 100 may be applied, a well-known analytics problem in the insurance industry is claims fraud, where a user will submit a fraudulent insurance claim. An insurance company may record data that is used by the detection device 110 to derive attributes of a fraudster and to construct a model of the insurance company's customers and their behaviors. As described above, the model may then be used to find new fraudsters within the model through analysis of the behavior of the users. It is noted that although the present disclosure provides several exemplary situations and industries in which the system 100 may be deployed to identify and mitigate outlier network activity, these particular examples have been provided for purposes of illustration, rather than by way of limitation. Accordingly, it should be understood that the system 100 may be readily applied to other situations and industries to identify and mitigate outlier network activity in accordance with embodiments of the present disclosure.

As shown above, the system 100 is configured to create one or more models that facilitate improved processes for identifying outlier network activity. In particular, the one or more models constructed in accordance with embodiments capture information associated with network user behaviors and interactions between different network users and/or network services, as well as other attributes. This reduces the number of false positive instances of outlier network activity identified by the system 100 and improves the accuracy of the system 100. For example, in a rule- or threshold-based approach, one feature (e.g., a single transaction) can trigger an alert, which may cause a significant number of false positives to be generated. In contrast, the system 100 utilizes a holistic approach that evaluates the modeled network of users based on one or more rule sets and decision engine logic to identify users that exhibit attributes (e.g., behaviors, connections, relationships, activity, and other attributes) that are similar to attributes of known cases of outlier activity. By taking various user attributes into consideration, as well as how those attributes compare to attributes of known outliers, the system 100 may detect outlier network activity with a higher degree of accuracy than existing rule- or threshold-based systems, which often focus on a narrow view of users, such as focusing only on one or more transactions of an individual user.

Additionally, the system 100 also implements self-learning techniques that utilize feedback to further tune and improve the processes executed by the system 100, such as automatically propagating changes through the network model(s). The system 100 also executes various processes to mitigate the impact of outlier network activity. For example, the system 100 may disable access to one or more networks and/or network resources by network users identified as outliers, or execute other mitigation processes. In embodiments, the system 100 may provide various interactive tools and user interfaces that may enable an end-user of the system 100 to monitor and evaluate the performance of the system 100, investigate identified cases of outlier network activity, and/or provide feedback to the system 100. Additional aspects of the benefits provided by the system 100, as well as the interactive tools and interfaces that the system 100 may provide, are described in more detail below with reference to FIGS. 2-16.

Figure 2:
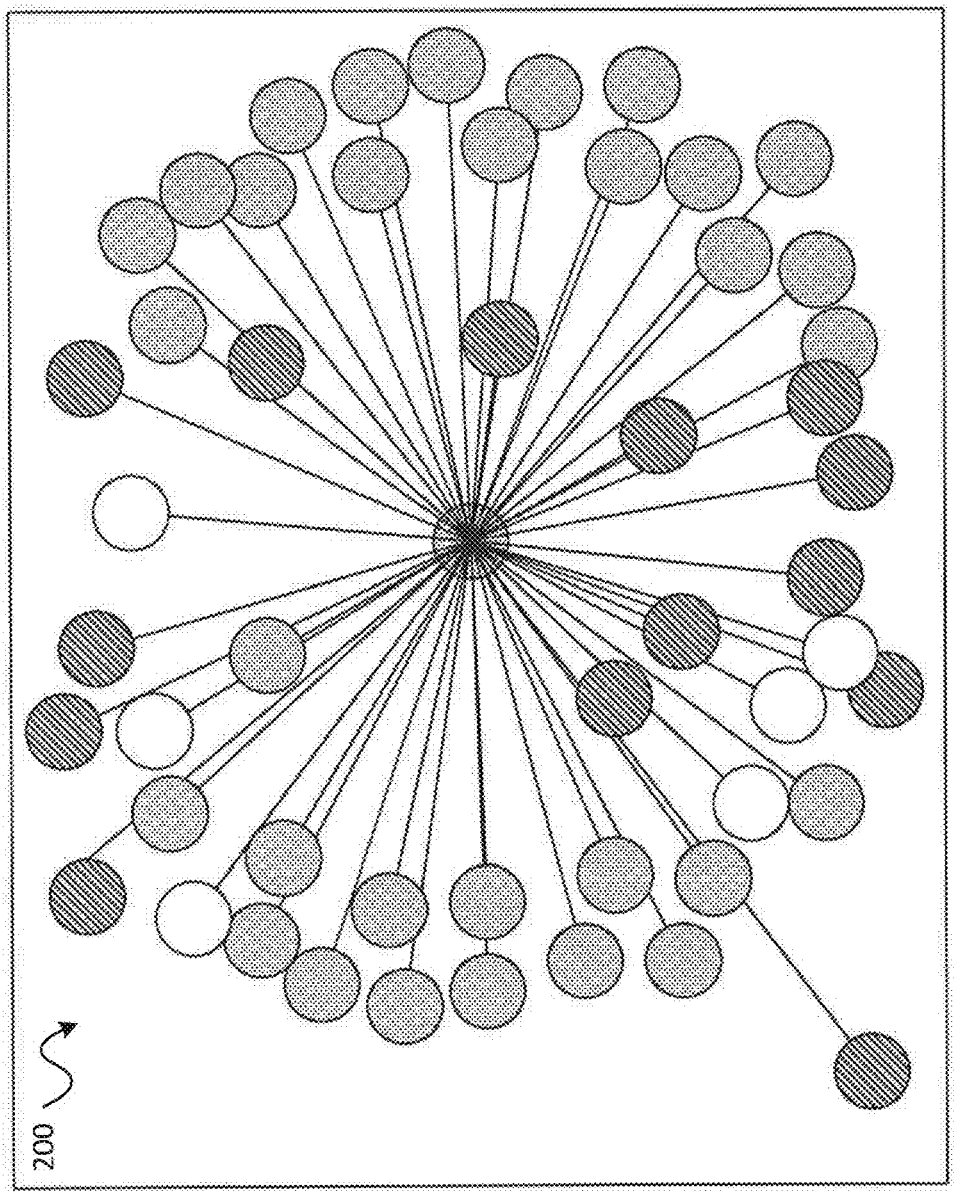
FIG. 2 is a diagram illustrating an interactive tool for visualizing user behaviors and associations in accordance with embodiments of the present disclosure.

Referring to FIG. 2, a diagram illustrating an interactive tool for visualizing user behaviors and associations in accordance with embodiments of the present disclosure is shown as an interface 200. In FIG. 2, the centroid customer at the center of the interface 200 may be the subject of an investigation regarding outlier network activity, and the interface 200 may facilitate a behavioral comparison of the centroid customer against low risk users 202 and high risk users 206, such as known outliers, where users identified by the system as outliers within the network of users are shown at 204. The interactive tool provided by the interface 200 may enable users to be categorized, as described above. The ability to correctly identify users prior to analysis helps de-prioritize low risk cases and may allow end users of a system operating in accordance with embodiments of the present disclosure to focus on abnormal or outlier network activity analysis.

In aspects, the system (e.g., the system 100 of FIG. 1) may be configured to incorporate data derived from other systems, such as existing threshold-based systems. For example, if the existing system identified specific users as being engaged in high risk activity (e.g., based on a threshold technique), that information may be integrated into the model(s) by the system of embodiments. Additionally, those users may be identified within the interactive tool of the interface 200 and treated as high priority cases in the end user's workflow.

It is noted that the interactive tool of FIG. 2, and the features and benefits that it provides, are facilitated by the techniques utilized by the systems of the present disclosure. For example, as described above with reference to FIG. 1, network models constructed in accordance with the present disclosure may include graphs that capture various attributes of the network of users, such as behaviors, connections, relationship, network activity, and other attributes. The system may be configured to evaluate the network model(s) against one or more rule sets to identify communities within a network of users, compare attributes of the network users to attributes of known outliers within the network of users, determine strengths of connections between different network users, and other types of outlier network activity analysis. The system may then execute decision engine logic against the results of the evaluation of the model(s) to identify instances of outlier network activity within the network of users. Traditional techniques that focus on comparisons of one or more transactions to a threshold may not be capable of facilitating these types of analysis (e.g., because the focus is on characteristics of the transaction(s) rather than on the behavior of the users). Additional features and benefits of the interactive tool illustrated in the interface 200 of FIG. 2 and the network models and processes implemented by systems in accordance with embodiments are described below.

Figure 3:
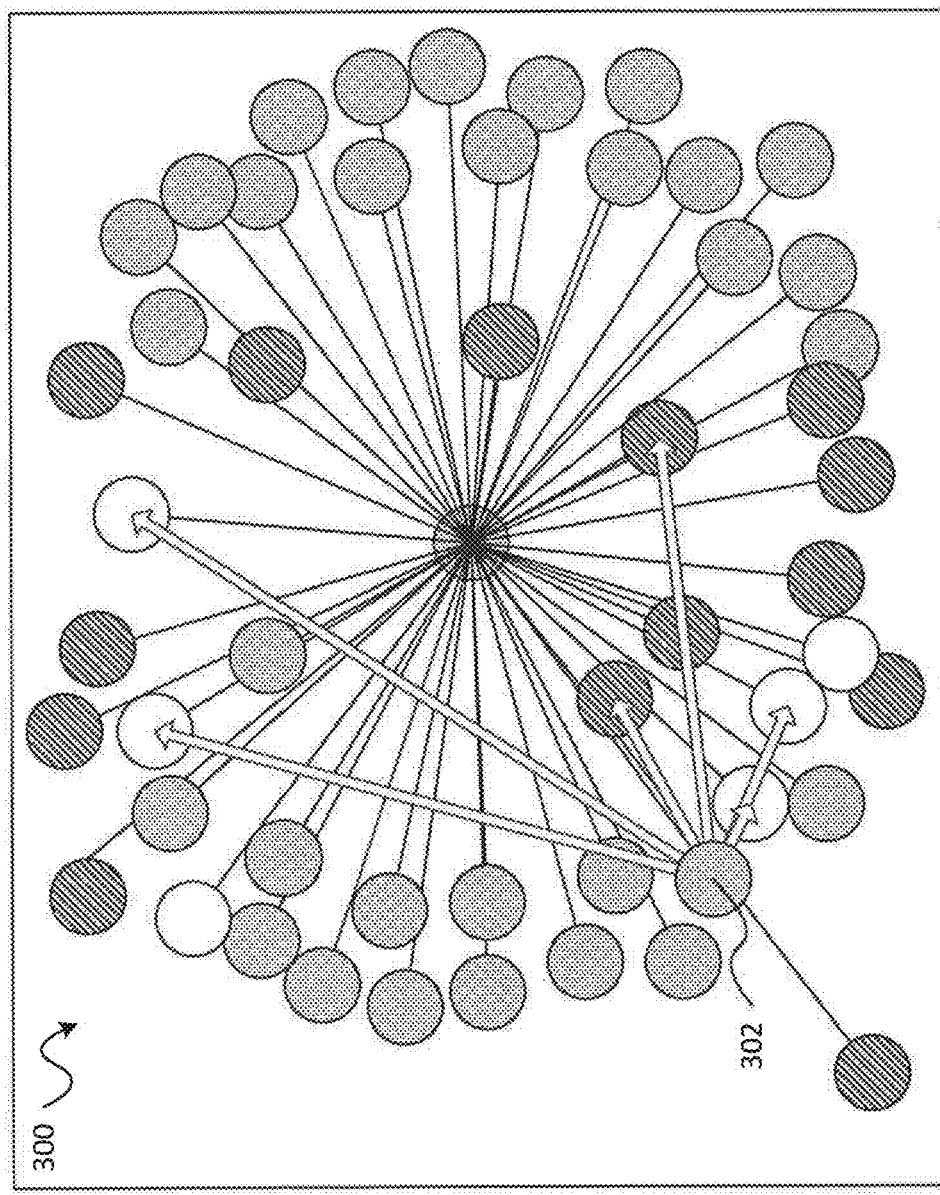
FIG. 3 is a diagram illustrating concepts for detecting new cases of outlier activity based on comparing user behavior against other users in accordance with embodiments of the present disclosure.

Referring to FIG. 3, a diagram illustrating concepts for detecting new cases of outlier activity based on comparing user behavior against other users in accordance with embodiments of the present disclosure is shown. As described above, systems operating in accordance with the present disclosure may detect new cases of outlier network activity by assessing the behavioral similarities between users within a network of users. In FIG. 3, a visual representation of aspects of a network model constructed in accordance with embodiments is shown as a model 300. The model 300 includes low risk users 304, high risk users 308, such as known outliers, and users 306 that the system has identified as outliers within the network of users. The users 306 may be identified as outliers based on a comparison of the attributes (e.g., behaviors, connections, relationships, activity, and other attributes) of each user to attributes of the known high risk users 308 to identify behavioral similarities.

For example, in FIG. 3, the system may evaluate the user 302 against all low risk users 304, high risk users 308, and remaining users 306 to evaluate how attributes of the user 302 compare to the attributes of those other users of the model. Based on this analysis, the system (e.g., the decision engine) may determine whether a previously unidentified new case should be raised (e.g., the system determines whether the user 302 be identified as an outlier). If the system identifies the user 302 as potentially high risk (e.g., the system determines that the user 302 exhibits attributes similar to the attributes of the high risk users 308), then the user 302 may be identified as an outlier within the network model and a new case of outlier network activity may be raised.

As described above, by focusing on the attributes of the users within the network model, including attributes of known outliers, the systems of embodiments may identify new cases based on the overall result of the analysis of the network model (e.g., the new cases are identified through execution of the decision engine logic against the outputs resulting from the evaluation of the network model against one or more rule sets associated with the attribute prediction module, the link prediction module, and the community detection module). In this manner, the processes executed by the system to identify outlier network activity operate on principles of user association modeling, where many attributes of a user contribute to how the system perceives that user's behavior and where the system identifies instances of outlier network activity based on how the user's perceived behavior compares to other users within the network. As explained above, this holistic approach more accurately identifies new cases of outlier activity and reduces the number of false positives identified by the system. Additionally, in embodiments where data from other outlier detection systems is integrated with a system operating in accordance with embodiments, the system may be configured to determine whether any identified cases of outlier network activity have been identified as a result of the analysis performed in accordance with embodiments, as well as the analysis performed by the other outlier detection system, and may designate those instances of outlier network activity as high priority cases.

Additionally, it is noted that, by focusing on attributes of the users, rather than narrowly-focused factors (e.g., comparing one or more transactions of a single user to a threshold), systems operating in accordance with embodiments may identify outlier network activity that may not have been identified otherwise. For example, in rules- or threshold-based systems that analyze individual user transactions against thresholds, an outlier may avoid detection by executing transactions designed to fall below the threshold. Despite these efforts, systems operating in accordance with embodiments may identify that user as engaging in outlier network activity based on the user's attributes (e.g., behavior, connections, relationships, activity, and other attributes), which are likely to exhibit similarities to other known outliers. Accordingly, systems operating in accordance with embodiments provide an improved ability to identify outlier network activity as compared to existing rules or threshold-based systems.

Figure 4:
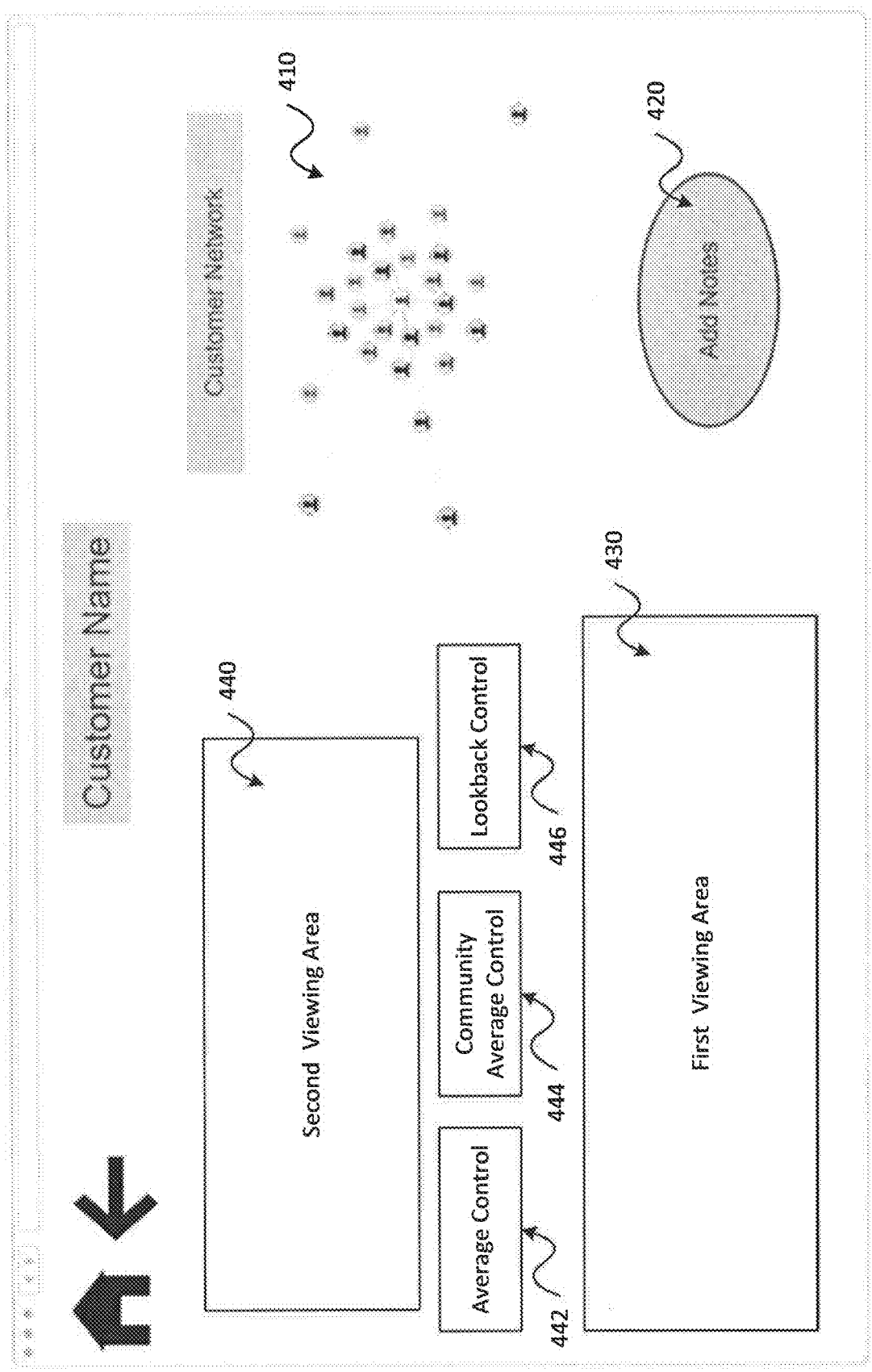
FIG. 4 is a screenshot of a user interface providing interactive tools for analyzing raised cases of outlier network activity in accordance with embodiments of the present disclosure.

Referring to FIG. 4, a screenshot of a user interface providing interactive tools for analyzing raised cases of outlier network activity in accordance with embodiments of the present disclosure is shown. As shown in FIG. 4, the interface may provide the end user with various interactive tools and ways in which to view information associated with the operations of the system. The interactive tools provided by the user interface of FIG. 4 may allow the end user to take a deep dive into a specific case to observe one or more the following: a customer's network of connections to other members of the network, customer features compared to past and average values, main outlier behaviors detected, or other factors. For example, as illustrated in FIG. 4, an interactive network model 410 constructed in accordance with embodiments is shown. Using the interactive network model 410, the end user may select one or more network nodes for further investigation. The end user may explore multiple characteristics of the customer and use an add notes control 420 to add notes to a particular node of the network. Additionally, via the interface illustrated in FIG. 4 (or another one of the various interfaces disclosed herein), the end user may escalate or convert an investigated case to outlier status (e.g., confirm a raised case is outlier network activity or provide feedback that indicates an identified case of outlier network activity was a false positive).

The interactive tools may also provide various filtering tools to alter the view and/or filter the nodes displayed within the network model 410 or view information regarding characteristics and metrics of one or more nodes, and other tools that may provide meaningful information to the end user. For example, network metrics and characteristics information may be presented to the end user via a first viewing area 430, while charts, maps, or other information may be presented within a second viewing area 440 of the exemplary interface illustrated in FIG. 4. Additional aspects associated with presenting metrics to the end user are described below with reference to FIGS. 6, 10, and 12, and additional aspects associated with presenting charts, maps, or other information are as described in more detail below with reference to FIGS. 7, 9, 11, and 16.

The exemplary graphical user interface illustrated in FIG. 4 may also provide the user with various controls for configuring the presentation of information within the first viewing area 430 and/or the second viewing area 440. For example, in FIG. 4, an average control 442, a community average control 444, and a lookback control 446 are illustrated. These controls may be used to configure the presentation of information to the end user via the second viewing area 440. For example, the second viewing area 440 may present a chart view that compares attributes (e.g., behavior, activity, or other characteristic(s)) of a user (e.g., the customer suspected of outlier network activity) to another party (e.g., one or more entities, groups, subgroups, individuals (e.g., other users), etc.). The average control 442 may be used to configure the display of information associated with user based on average values for the attributes of the user. The community average control 444 may be used to configure the display of information associated with the based on average values for the attributes of the party (e.g., the one or more entities, groups, subgroups, individuals (e.g., other users), etc.) to which the user is being compared. The lookback control 446 may be used to configure the period of time over which the user is compared to the other party. In this manner, a user's behavior may be evaluated and/or compared against other parties (e.g., other entities, groups, subgroups, individuals (e.g., other users), etc.) to determine whether that user's behavior is associated with outlier network activity or not. Additionally, the lookback period facilitates analysis of changes in the user's behavior over time, which may provide insights into changes in the user's behavior that may suggest the user is being influenced by outliers, as well as indications that the user's activity is or is not outlier network activity. For example, if user behavior is consistent across the period of time, this may suggest that the user's behavior is not associated with outlier activity, while sudden changes in the user's behavior may suggest that the user is engaged in outlier network activity.

Figure 5:
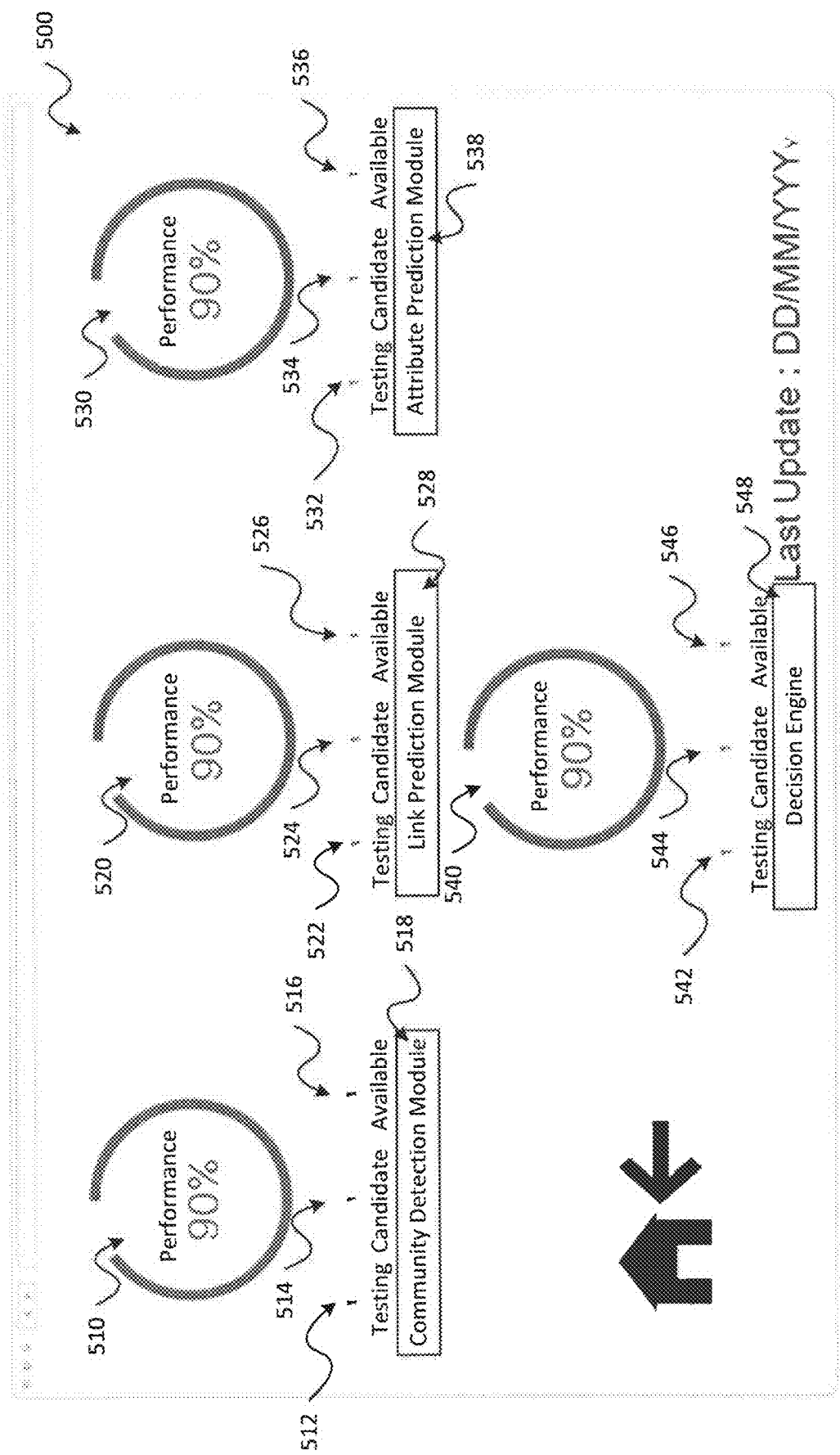
FIG. 5 is a screenshot of an exemplary interface for managing an outlier network activity detection system in accordance with embodiments of the present disclosure.

Referring to FIG. 5, a screenshot of an exemplary interface for managing an outlier network activity detection system in accordance with embodiments is shown as an interface 500. In aspects, the interface 500 may provide interactive tools that enable the end user to monitor the outputs generated by all of the models and the decision engine, as well as the overall performance of the system (e.g., the detection system 110 of FIG. 1). For example, the interactive tools illustrated in the interface of FIG. 5 include performance indicators 510, 520, 530, 540, data set indicators 512, 514, 516, 522, 524, 526, 532, 534, 536, 542, 544, and 546, and selectable elements (e.g., buttons) 518, 528, 538, 548.

The performance indicators 510, 520, 530, and 540 may provide a high-level indication of system performance. For example, the performance indicator 510 may indicate the performance of the community detection module, the performance indicator 520 may indicate the performance of the link prediction module, the performance indicator 530 may indicate the performance of the attribute prediction module, and the performance indicator 540 may indicate the performance of the decision engine. It is noted that the "performance" indicated by the various performance indicators 510, 520, 530, 540 may be representative of a metric, such as accuracy. For example, a performance indication of 90% may indicate that the a particular component or module of the system is accurately identifying outlier network activity in 90% of raised cases. However, it is also noted that the metric indicated by the performance indicators 510, 520, 530, 540 may be representative of other types of system performance, such as a false positive rate. In embodiments, the particular metric represented by each the performance indicators 510, 520, 530, 540 may be configurable (e.g., under a first configuration the performance indicators 510, 520, 530, 540 may represent a first performance metric, such as accuracy, and under a second configuration the performance indicators 510, 520, 530, 540 may represent a second performance metric, such as a false positive rate).

The data set indicators 512, 514, 516, 522, 524, 526, 532, 534, 536, 542, 544, and 546 may provide various pieces of information associated with the data sets used to train the various modules and the decision engine. For example, the testing indicator 512 associated with the community detection module may indicate the number of cases of outlier network activity identified by the system through evaluation of the one or more models against the one or more community detection rules, the candidate indicator 514 may identify any outlier network activity cases that were left out of the data set used to train the community detection module, and the available indicator 516 may indicate a number of true outlier cases available for training the community detection module. The indicators 522, 524, 526 show similar information for the link prediction module, the indicators 532, 534, 536 show similar information for the attribute prediction module, and the indicators 542, 544, 546 show similar information for the decision engine. This information may be used to evaluate whether a particular model should be retrained. For example, as more outlier network activity cases are confirmed using the various techniques disclosed herein, a module may be retrained using one or more data sets, and during the retraining, additional outlier cases may be considered. As the various modules are retrained using additional known cases of outlier activity, the performance of these modules may be improved (e.g., because they have more information upon Which to base the identification of outlier network activity).

The selectable elements 518, 528, 538, and 548 may be selected by the end user to adjust one or more parameters utilized by the attribute prediction module, the link prediction module, the community detection module, and/or the decision engine, respectively, such as adjusting the KPIs used for a particular execution of the modeling process, adjusting thresholds and/or weighting factors used in the modeling and/or model evaluation processes, and the like. For example, the end user may select the selectable element 518 to view and/or modify a configuration of the community detection module and may select the selectable element 528 to view and/or modify a configuration of the link prediction module. Additionally, the end user may select the selectable element 538 to view and/or modify a configuration of the attribute prediction module and may select selectable element 548 to view and/or modify a configuration of the decision engine. As shown above, the graphical user interface illustrated in FIG. 5 provides various interactive tools and information that may provide a high-level overview of the operational status of the outlier network detection system of embodiments, as well as the ability to fine tune its operations through tuning and/or training of the various modules of the system.

Figure 6:
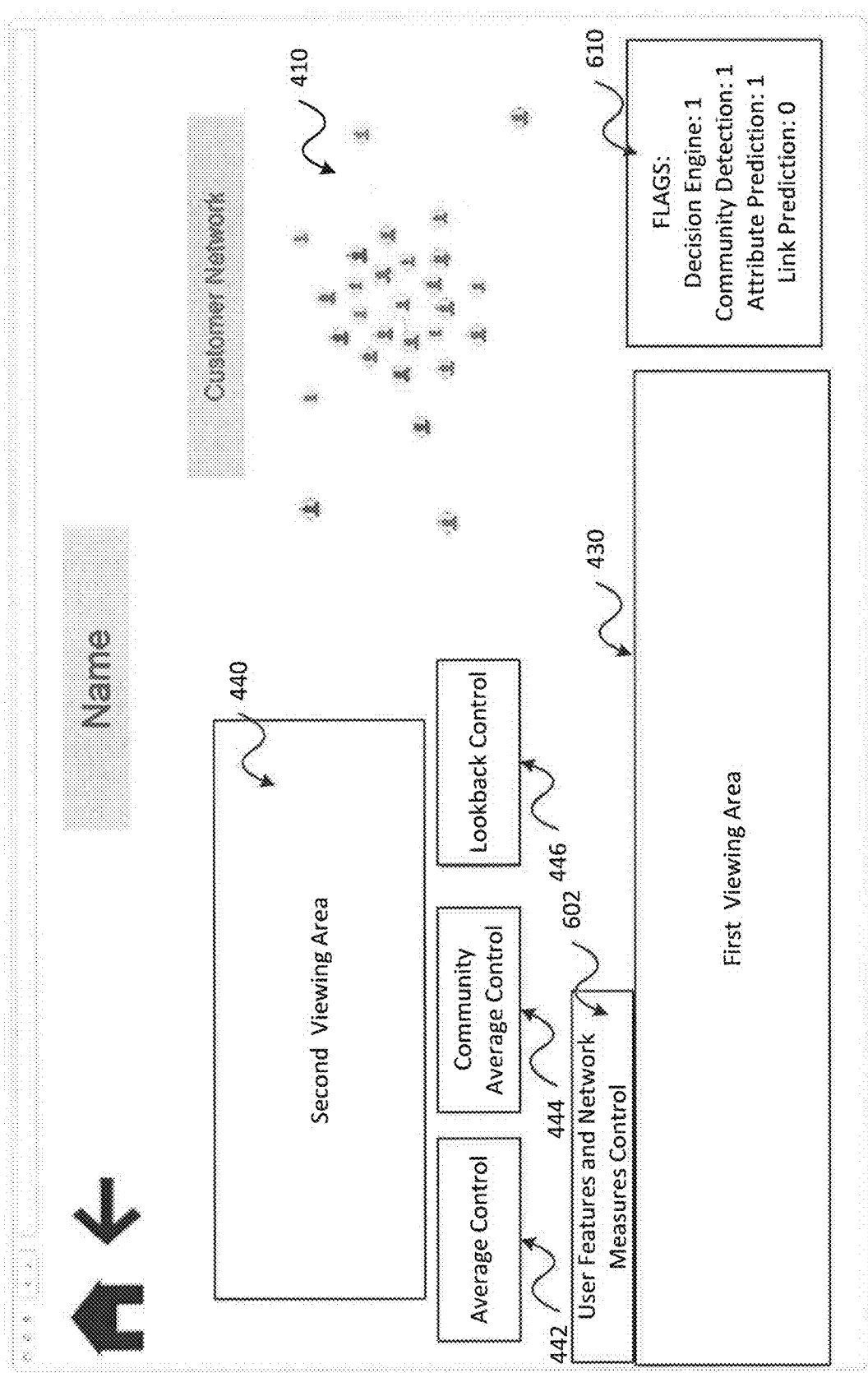
FIG. 6 is a screenshot illustrating additional aspects of a user interface for analyzing raised cases of outlier network activity in accordance with embodiments of the present disclosure.

Referring to FIG. 6, a screenshot illustrating additional aspects of a user interface for analyzing raised cases of outlier network activity in accordance with embodiments is shown. The user interface illustrated in FIG. 6 is similar to the user interface described above with respect to FIG. 4 and may enable the end user to view the model's output for each individual case as well as their features and network measures within the first viewing area 430. For example, the end user may select one or more of the nodes displayed in the interactive network model 410 and the information shown within the first viewing area 430 may be updated to provide information regarding one or more metrics, characteristics, or other information associated with the selected node(s). Additionally, a user features and network measure control

602 is shown. The control 602 may enable the end user to configure the particular information displayed within the first viewing area 430. For example, the control 602 may enable the end user to select the particular network metrics or other information shown in the first viewing area 430.

Additionally, in the exemplary interface shown in FIG. 6, a plurality of flags 610 are shown. The plurality of flags 610 may indicate the results of the analysis performed by one or more components of the system in accordance with embodiments of the present disclosure with respect to a particular user (e.g., a user selected from among the nodes illustrated in the interactive network model shown at 410). For example, the flag "Decision Engine: 1" may indicate that the decision engine identified the user as being associated with outlier network activity, the flag "Community Detection: 1" may indicate that the output of the community detection module identified the user as being associated with outlier network activity, the flag "Attribute Prediction: 1" may indicate that the output of the attribute prediction module identified the user as being associated with outlier network activity, and the flag "Link Prediction: 0" may indicate that the output of the link prediction module did not identify the user as being associated with outlier network activity. The flags 610 may provide the end user with a quick reference regarding the outcomes of the analysis performed by the various techniques of embodiments with respect to the behavior of a particular user selected within the interactive model 410. In aspects, the interface may also be used to tune and modify the models accordingly.

Figure 7:
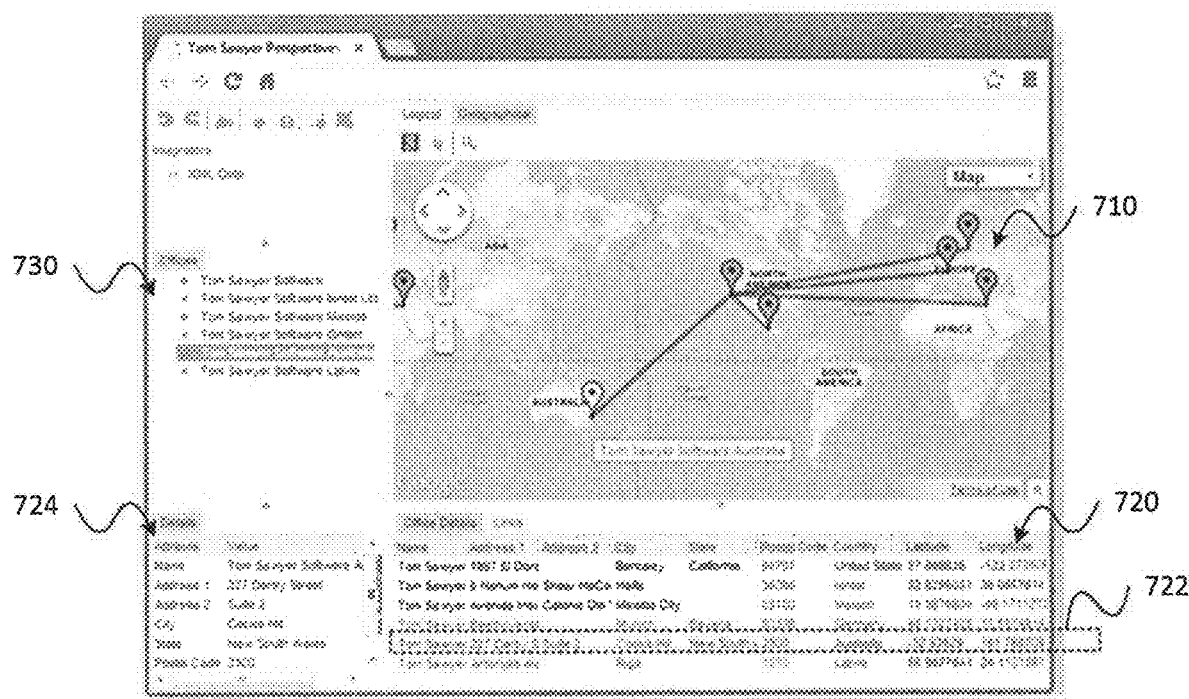
FIG. 7 is a screenshot of an interactive tool that illustrates geographic information associated with various nodes of a network in accordance with embodiments of the present disclosure.

Referring to FIG. 7, a screenshot of an interactive tool that illustrates geographic information associated with various nodes of a network (e.g., nodes illustrated in the network shown in FIGS. 4 and 6) in accordance with embodiments of the present disclosure is shown. As illustrated in FIG. 7, one or more nodes associated with a network model may be displayed on a geographic map 710. In aspects, the geographic locations may be based on a longitude and latitude associated with each node (e.g., user). It is noted that the system's ability to display the nodes on the geographic map 710 may be limited by the availability of information regarding the location of the user. Further, it is noted that other types of location information may be used to present nodes on the geographic map, such as address information, internet protocol (IP) address information (e.g., the IP address of a device used by a particular user to access a network, which may be derived from information obtained by the system from an entity, such as a service provider operating the network or providing one or more services to the user via the network), or other types of information that may be used to estimate a location of the users.

Additionally, user and location information (e.g., identity of the node, street address, city, state, zip code, country, longitude, latitude, etc.) regarding each of the nodes indicated within the geographic map 710 may be presented within a viewing area 720. Upon selection (indicated by box 722) of one of the rows illustrated within the viewing area 720, a detailed view of the selected node may be shown in a detail view 724, in a viewing area 730, a list of each node presented within the map 710 may be shown. The geographic map 710 and other information presented within the exemplary interface of FIG. 7 may provide the end user with an understanding of areas with a higher risk than others and provide insights on where users identified as outliers (e.g., hackers, fraudsters, etc.) are compared to their associations, such as providing a better understanding of which nationalities play a more influential role. In aspects, filters may be used to correlate particular users to other users (e.g., denote which users are connected or are part of a same community). For example, lines connecting various nodes presented within the geographic map 710 and/or the symbols representing each node may be coded (e.g., using different colors, different patterns of dashes and/or dots, and the like) to denote members of different communities.

Figure 8:
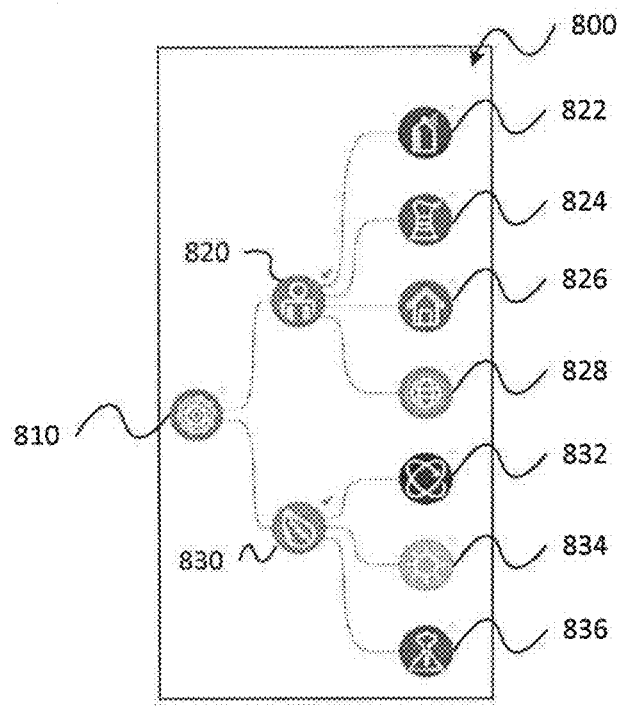
FIG. 8 is a screenshot illustrating an interactive tool for filtering identified instances of outlier activity within a network based on exhibited attributes in accordance with embodiments of the present disclosure.

Referring to FIG. 8, a screenshot illustrating an interactive tool for filtering identified instances of outlier activity within a network based on exhibited attributes in accordance with embodiments is shown. As shown in FIG. 8, at least a subset of the nodes of a network model may be arranged into a hierarchical tree 800 that organizes the outlier population into various branches and/or leaves according to various characteristics (e.g., KPIs, a context or situation associated with the network model, and the like) associated with cases of outlier network activity identified by the system.

For example, in FIG. 8, a root node 810 of the hierarchical tree structure 800 may represent all identified cases of outlier network activity identified within a particular network model. A first branch 820 of the hierarchical tree structure 800 may correspond to a first subgroup of outliers within the identified outlier population (e.g., the cases represented by the root node 810), and a second branch 830 of the hierarchical tree structure 800 may correspond to a second subgroup of outliers within the identified outlier population. As an example, a system operating in accordance with embodiments may be used to evaluate an entity's cybersecurity. As described above, the system may construct a model representative of the entity's network of users. The network of users may include employees of the entity and third parties (e.g., subscribers to a service offered by the entity, customers of the entity, consultants that advise the entity, vendors that provide services to the entity, users that send e-mail marketing to the entity's employees, and the like). In this exemplary situation, the root 810 may represent all identified cases of outlier network activity (e.g., all users that have been identified as exhibiting attributes characteristic of potential cyber threats). The first branch 820 may represent a first subgroup of outliers within the identified outlier population, and the second branch 830 may represent a second subgroup of outliers within the identified outlier population. It is noted that the exemplary hierarchical tree structure 800 has been provided for purposes of illustration, rather than by way of limitation, and that hierarchical tree structures constructed in accordance with embodiments may include more than two branches.

As shown in FIG. 8, each branch of the hierarchical tree 800 may have one or more leaves associated with characteristics common to the outliers associated with a corresponding branch. For example, the first branch 820 includes a plurality of leaves 822, 824, 826, and 828, and the second branch 830 includes leaves 832, 834, and 836. The leaves 822, 824, 826, and 828 of the first branch 820 may be associated with characteristics of the outliers corresponding to the first branch 820, and the leaves 832, 834, and 836 may be associated with characteristics of the outliers corresponding to the second branch 830. In this manner, the population of outliers may be viewed as a plurality of subgroups, where each subgroup represents a group of outliers that pose a threat to the entity's cybersecurity and share common characteristics.

By depicting the outlier population based on the different characteristics, the hierarchical tree structure 800 provided by the interactive tool illustrated in FIG. 8 may enable the end user to identify connections between different characteristics and/or attributes. This may provide the end user with a better understanding of how different users influence each other. In aspects, the interactive tool illustrated in FIG. 8 may be used by an end user to confirm cases of outlier network activity raised by the system. For example, during analysis of raised cases of outlier activity, the end user may use the interactive tool illustrated in FIG. 8 to generate a hierarchical tree structure that provides insights into the behaviors of different subgroups of outliers, and based on these insights, the end user may provide feedback to the system regarding whether or not a particular raised case is, in fact, outlier network activity. Additionally, the insights provided through the generation of the hierarchical tree structure may be used to provide feedback to the system. In aspects, the system may execute self-learning processes that utilize the feedback from the end user to tune one or more aspects of the various system processes and components, such as modifying the model, modifying how various characteristics are utilized and/or weighted by the system (e.g., during graph generation), modifying one or more rule sets of the systems modules and/or modifying the decision engine (e.g., adjusting weights applied to the outputs of the various modules), or other tuning operations.

Figure 9:
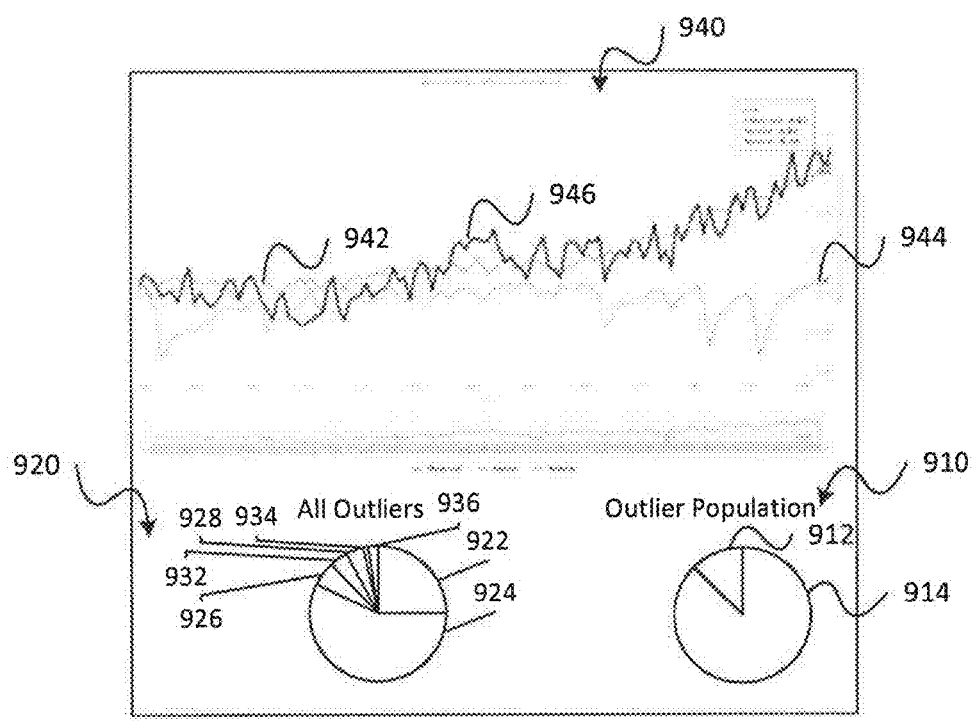
FIG. 9 is a screenshot illustrating a graphical user interface that provides an interactive tool for evaluating outlier network activity in accordance with embodiments of the present disclosure.

Referring to FIG. 9, a screenshot illustrating a graphical user interface that provides an interactive tool for evaluating outlier network activity in accordance with embodiments of the present disclosure is shown. The interactive tools provided by the interface of FIG. 9 may allow the end user to view information associated with identified outlier network activities and outlier populations in various ways.

In FIG. 9, a pie chart 910 representing an identified outlier population is shown. In aspects, the pie chart 910 may be associated with a hierarchical tree structure generated in connection with an identified outlier population, as described above with reference to FIG. 8, and may provide the end user with additional information about the outlier population. To illustrate, a first portion 912 of the pie chart 910 may be associated with a first subgroup of the outlier population (e.g., the outlier population associated with first branch 820 of the hierarchical tree structure 800), and a second portion 914 of the pie chart 910 may be associated with a second subgroup of the outlier population (e.g., the outlier population associated with second branch 830 of the hierarchical tree structure 800). Viewing the outlier population in this manner may provide the end user with an understanding of the relative size of various subgroups within an identified outlier population.

In FIG. 9, another pie chart 920 representing characteristics associated with an identified outlier population is shown. In aspects, the pie chart 920 may be associated with a hierarchical tree structure generated in connection with an identified outlier population, as described above with reference to FIG. 8, and may provide the end user with additional information about the characteristics of the outlier population. To illustrate, in the pie chart 920, a first portion 922 may be associated with a first characteristic of the outlier population (e.g., the characteristic associated with the leaf 822 of the hierarchical tree structure 800), a second portion 924 may be associated with a second characteristic of the outlier population (e.g., the characteristic associated with the leaf 824 of the hierarchical tree structure 800), a third portion 926 may be associated with a third characteristic of the outlier population (e.g., the characteristic associated with the leaf 826 of FIG. 8), a fourth portion 928 may be associated with a second characteristic of the outlier population (e.g., the characteristic associated with the leaf 828 of FIG. 8), a fifth portion 932 may be associated with a second characteristic of the outlier population (e.g., the characteristic associated with the leaf 832 of FIG. 8), a sixth portion 934 may be associated with a second characteristic of the outlier population (e.g., the characteristic associated with the leaf 834 of FIG. 8), and a seventh portion 936 may be associated with a seventh characteristic of the outlier population (e.g., the characteristic associated with the leaf 836 of FIG. 8). Viewing the characteristics of an identified outlier population in this manner may provide the end user with an understanding of the which characteristics are more prevalent within an identified outlier population or subgroup within the outlier population.

The interactive tools of FIG. 9 may further be configured to present a chart view of information associated with an outlier population. For example, in FIG. 9, a chart 940 is shown. The chart 940 may facilitate a comparison of suspected outlier network activity to information associated with different subgroups within an outlier population. To illustrate, in the chart 940, a first line 942 may be associated with activity (or other information) associated with the first portion 912 of the outlier population, a second line 944 may be associated with activity (or other information) associated with the second portion 914 of the outlier population, and a third line 946 may be associated with activity (or other information) associated with a newly identified instance of outlier network activity. As can be seen in the chart 940, the information represented by the third line 946 appears to track the information represented by the first line 942. This may suggest that the newly outlier network activity represented by the third line 946 was accurately identified by the system and that this newly discovered outlier is behaving in a manner that is similar to the members of the first portion 912 of the outlier population.

As shown above, the exemplary chart view illustrated in FIG. 9 may provide various insights that may be used to analyze the behavior of network users. This type of analysis, which is facilitated by the construction of the network model and the various processes that operate on the model (e.g., to classify users into communities, etc.) in accordance with embodiments of the present disclosure, enables the end user to understand root causes associated with changes in behavior that result in users being considered outliers within the network. It is noted that the various charts illustrated in FIG. 9 and described above have been provided for purposes of illustration, rather than by way of limitation, and that the interactive tools for generating the charts illustrated in FIG. 9 may be configured to present information other than the specific examples described above. For example, the interface of FIG. 9 may be configured to generate charts based on information about communities (e.g., the communities identified by the community detection module), charts comparing a user to one or more identified communities, or other types of information.

Figure 10:
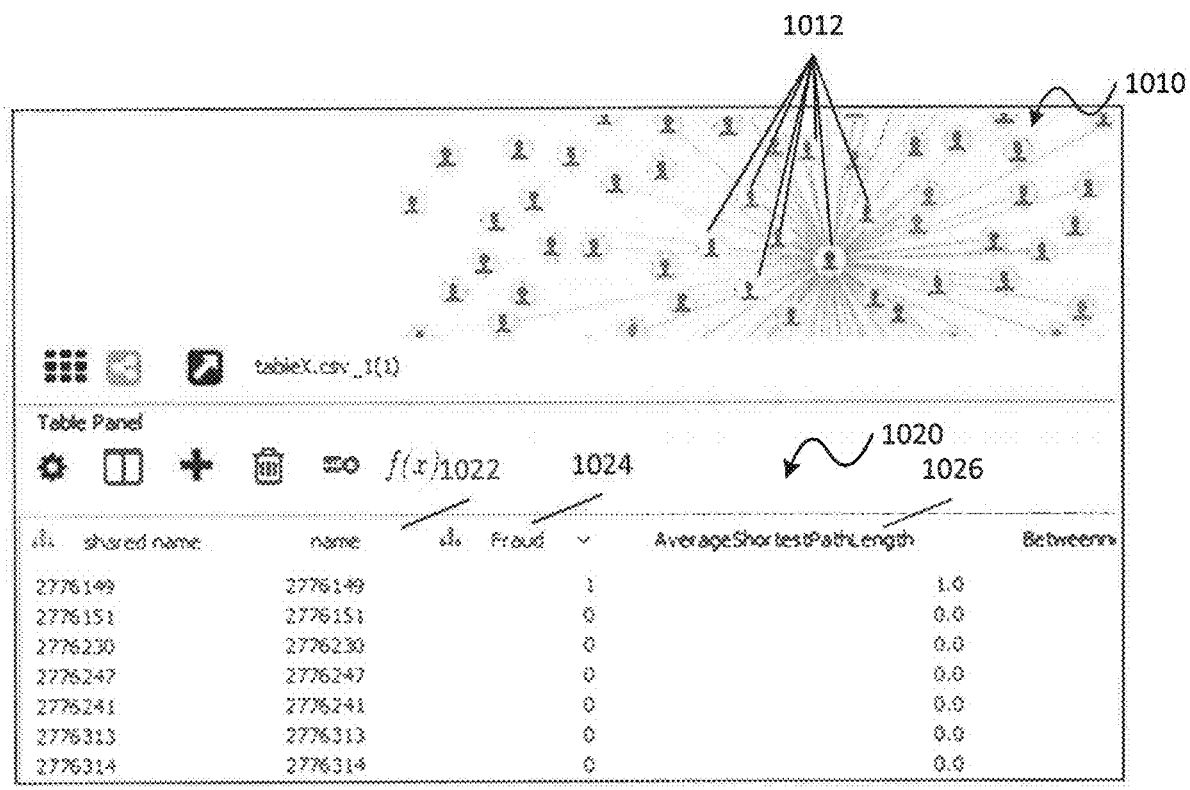
FIG. 10 is a screenshot illustrating a graphical user interface that provides information about nodes within a network model constructed in accordance with embodiments of the present disclosure.

Referring to FIG. 10, a screenshot illustrating a graphical user interface that provides information about nodes within a network model constructed in accordance with embodiments of the present disclosure is shown. As shown in FIG. 10, a network or portion of the network may be depicted in a first viewing area 1010. In aspects, the network may be provided by an interactive tool that enables the end user to select particular nodes of the network. For example, in FIG. 10, a plurality of selected nodes 1012 are shown. Upon selecting various nodes depicted in the network, various types of information may be displayed in a second viewing area 1020. For example, as shown in FIG. 10, the information displayed within the second viewing area 1020 may include information that identifies selected nodes 1022, outlier indication information 1024 (e.g., information that indicates whether a particular node is a known outlier), network metrics information 1026 (e.g., average shortest path length, or other network metrics determined by the link prediction module), and/or other information depending on a particular configuration of the interface. In aspects, the graphical user interface illustrated in FIG. 10 may enable the end user to view information associated with nodes of the network, which may provide the end user with a better understanding of whether one or more nodes are outliers and/or a better understanding of relationships and connections between outliers within the network.

Figures 11, 12:
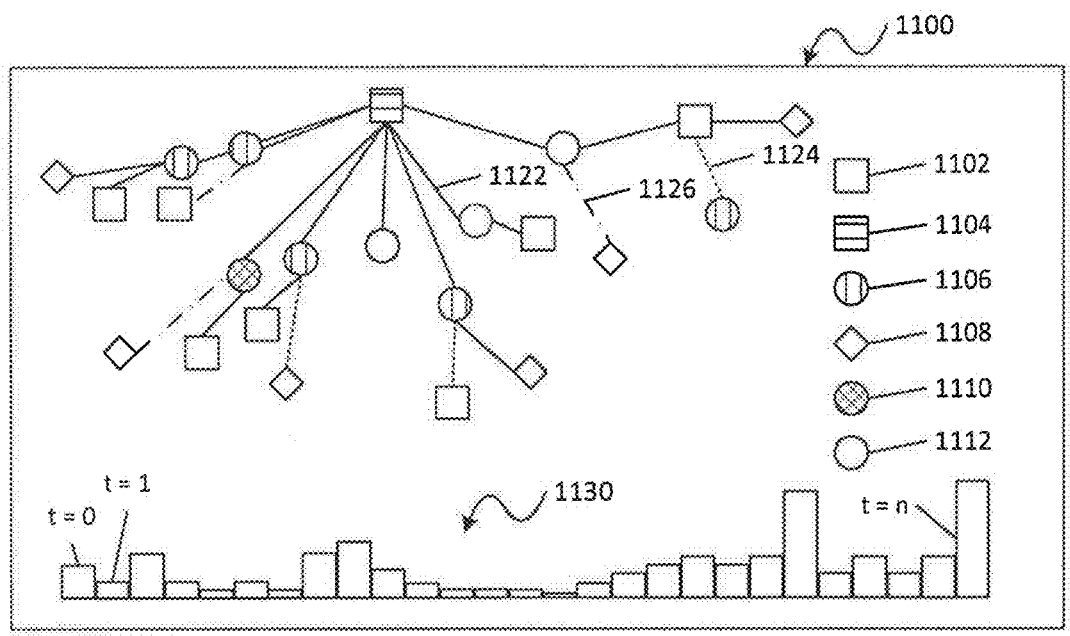
FIG. 11 is a screenshot illustrating a graphical user interface configured to depict various aspects of network activity over time in accordance with embodiments of the present disclosure.
FIG. 12 is an exemplary graphical user interface for presenting information associated with a network model constructed in accordance with embodiments of the present disclosure in a table view.

Referring to FIG. 11, a screenshot illustrating a graphical user interface configured to depict various aspects of network activity over time in accordance with embodiments of the present disclosure is shown. The interface may facilitate visualization of appearance of abnormal accounts over time and may be updated as additional data is received by the system. For example, the interface may provide the end user with the capability to view snapshots or representations of the network (e.g., the nodes, the node behaviors and associations/connections, etc.) at different points in time. This allows the end user to visually see how the network and the users' behavior are changing over time, which may provide a more detailed and thorough understanding of outlier activity within the network. The information presented within the interface of FIG. 11 may also enable identification of common root causes associated with increases in identified outliers within the network at a given point in time.

As shown in the exemplary interface of FIG. 11, different types of users within the network may be depicted by different symbols 1102, 1104, 1106, 1108, 1110, 1112. In aspects, the different symbols used to represent the network users may be labeled (e.g., using identifiers that identify each node to the system, or some other labelling scheme). Additionally, various ones of the nodes may be connected by links, which show how the various users may be connected within the network. In aspects, the links may be coded to provide additional information. For example, in FIG. 11, a first type of link 1122 is shown as a solid line, a second type of link 1124 is shown as a dashed line, and a third type of link 1126 is shown as a series of dashes and dots. These different types of links may convey additional information about the users and information illustrated in FIG. 11. For example, the different types of links may represent various types of connections that the users might have, with different types of connections indicating varying levels of risk.

Additionally, the interface of FIG. 11 may provide a timeline 1130 representing activity within the network over a time period (e.g., from a time t=0 to a time t=n). The timeline 1130 may indicate how dynamic and/or static the network or a snapshot of the network is.

Referring to FIG. 12, an exemplary graphical user interface providing a table view that shows information associated with nodes and/or edges of a network model constructed in accordance with embodiments of the present disclosure is shown as a table view 1200. In aspects, the information illustrated in the table view 1200 may include information associated network measures (e.g., the network measures determined by the link prediction module), user attributes, and other information, where each row of the table view 1200 is associated with a particular user and different columns of the table view 1200 are associated with different types of user information. In aspects, a time series may be applied and visualized from the table view. For example, the table view 1200 may include multiple rows of information for a single user, where each row may include a snapshot of the user's system information at different points in time. This may facilitate analysis of changes in user activity and behavior over time. Such a table may be used to present one or more charts depicting differences in the user's behavior, as perceived by the system, at the different points in time and/or charts comparing the user to an outlier population (or subgroup of the outlier population), a community, or other types of analysis. In aspects, the table view 1200 may be viewed from one or more other interfaces described herein, such as the interfaces described with reference to FIGS. 4, 6, and 10.

Figure 13:
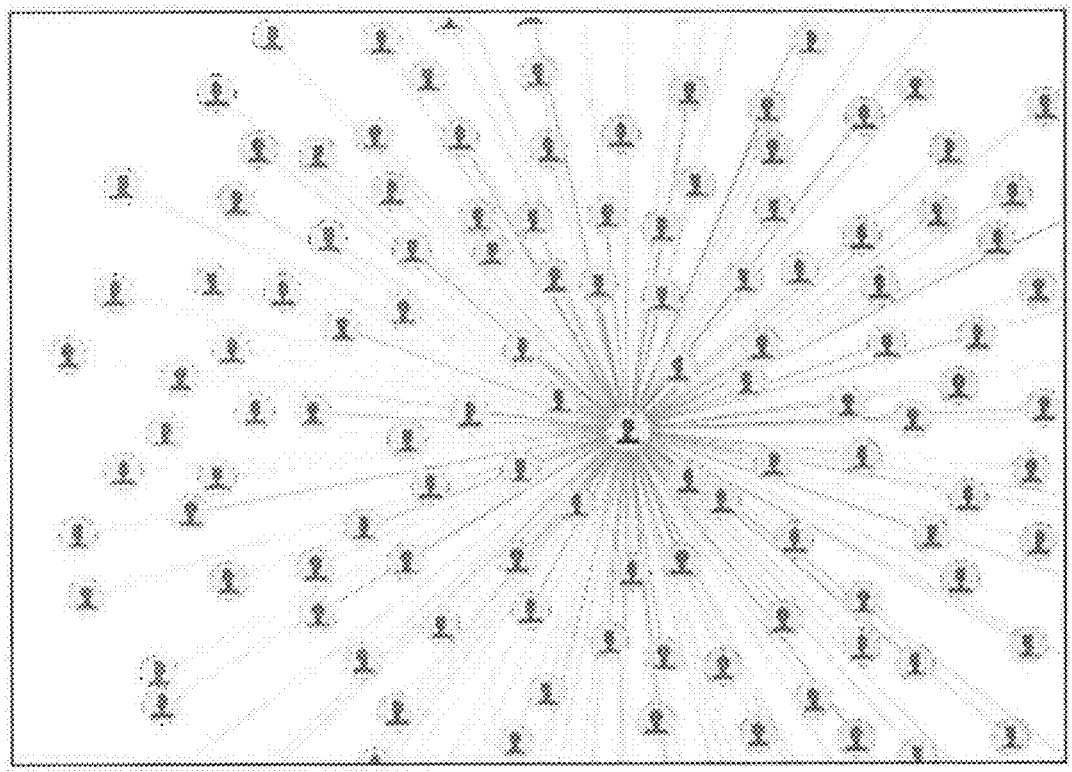
FIG. 13 is a diagram illustrating a graphical user interface that provides a drawing view of at least a portion of a network model constructed in accordance with embodiments of the present disclosure.

Referring to FIG. 13, a diagram illustrating a graphical user interface that provides a drawing view of at least a portion of a network model constructed in accordance with embodiments of the present disclosure is shown. The drawings view illustrated in FIG. 13 may be used to graphically depict relationships and user networks, similar to the manner in which the networks are visualized in FIGS. 2 and 3. For example, the drawing view may allow the end user to see users that interact with a known outlier and the degree of association. This interactive tool may be utilized to review closely associated nodes or users to determine if additional outlier activity may be present at the associated nodes. Additionally, the drawing view illustrated in FIG. 13 may be filtered to limit the nodes that are presented. For example, a filter may be applied to the map view to limit the displayed nodes to a particular community; limit the displayed nodes to ones that are connected to, and within a threshold distance of, a node of interest; or other filtering operations to distill the representation of the network model/graph to a form that provides meaningful information or makes that information easier to understand, view, etc. It is noted that the exemplary filtering operations described above have been provided for purposes of illustration, rather than by way of limitation, and the other filtering operations may be utilized in accordance with the present disclosure.

Figure 14:
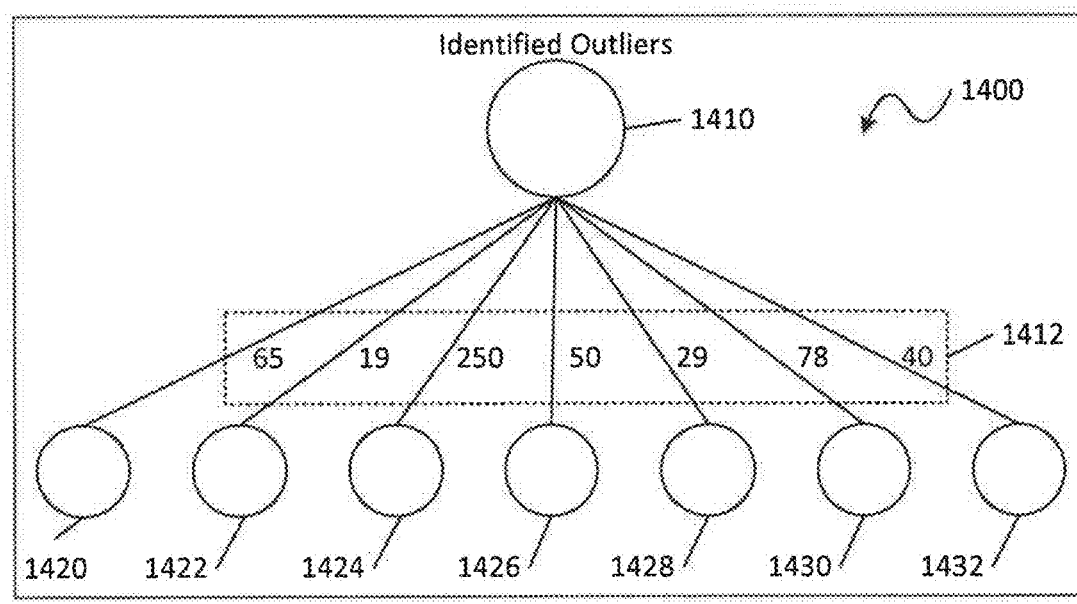
FIG. 14 is a screenshot illustrating a graphical user interface that provides another tree view for analyzing outlier network activity.

Referring to FIG. 14, a screenshot illustrating a graphical user interface that provides another tree view for analyzing outlier network activity in accordance with embodiments of the present disclosure is shown as a tree view 1400. The tree view 1400 may be configured to quickly provide end users with a visualization of raised cases and understand why they were triggered. For example, in a particular use case or situation under which the system of embodiments is operating, the tree view 1400 may indicate the various cases of outlier network activity that were raised by the system, as shown at 1410, and may also classify those raised cases into various categories based on patterns of activity and/or attributes that triggered identification of the outliers, such as changes associated with user transactions, user behavior, or other information. The tree view 1400 may indicate each of the various patterns as a series of leaves, shown in FIG. 14 as leaves 1420, 1422, 1424, 1426, 1428, 1430, and 1432. In aspects, the tree view 1400 may also indicate a number of outliers identified based on each of the different patterns, as indicated at 1412. For example, the number "40" has been used to label the connection between the identified outliers 1410 and the leaf 1432, which indicates that 40 of the identified outliers were identified as exhibiting behavior consistent with the pattern corresponding to leaf 1432. Similar labels are shown for the connections between the identified outliers 1410 and the other leaf nodes.

The tree view 1400 may provide the end user with a context for further investigation. For example, if a case is raised because of a change in transaction information, the end user may review information about the suspected outlier node/user's transaction history to determine if the transaction(s) that triggered the raised case was indeed outlier network activity (e.g., money laundering activity) or just an anomaly. Additionally, if a single raised case is identified under multiple branches of the tree, this may provide a stronger indication that the raised case is legitimate (e.g., not a false positive identification of outlier network activity).

Figure 15:
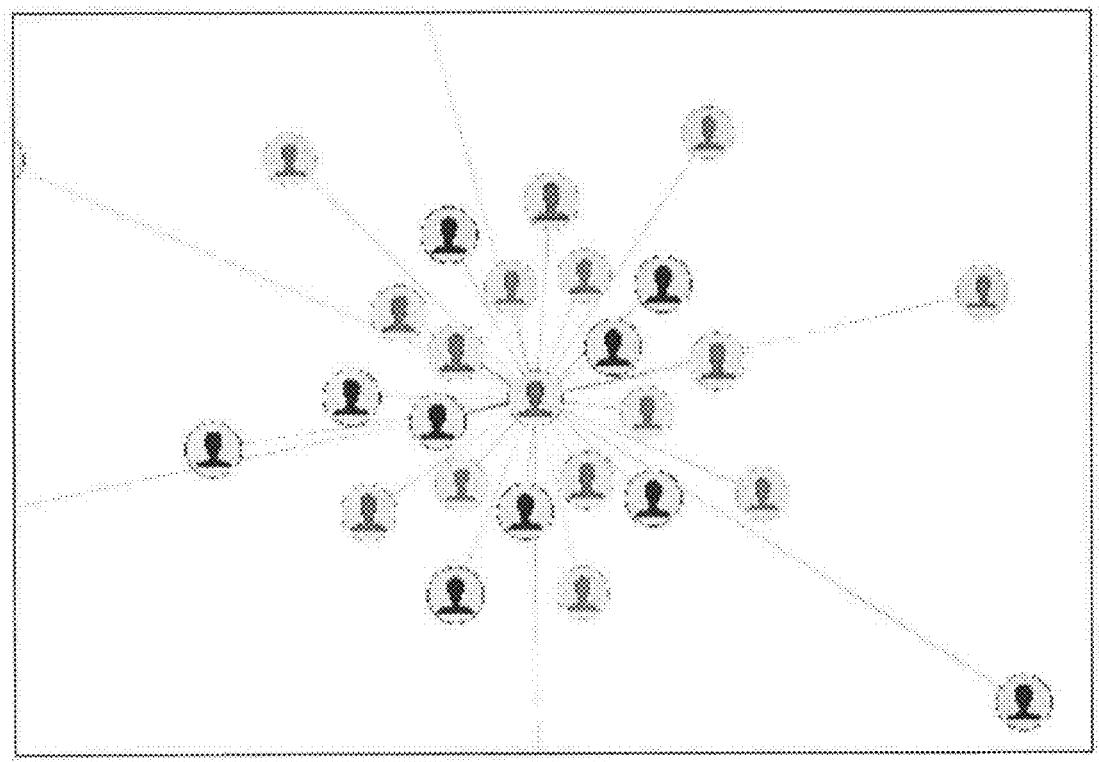
FIG. 15 is a screenshot illustrating a graphical user interface that provides end users with the ability to produce different types of views of a network model constructed in accordance with embodiments of the present disclosure.

Referring to FIG. 15, a screenshot illustrating a graphical user interface that provides end users with the ability to produce different types of views of a network model constructed in accordance with embodiments of the present disclosure is shown. The end user may utilize an interactive tool, such as the interactive filtering tools described above with reference to FIG. 13, to produce a different network view for each of the categories shown in the tree view 1400 of FIG. 14. This viewing capability may enable the end user to gain a better understanding of how users are connected with each other. For example, this interactive tool may enable the end user to visualize a particular user's direct network (e.g., other users that are directly connected to the particular user via the graph), which may provide information about how closely the particular user is associated to confirmed outliers. A user that is closely associated to many confirmed outliers may provide a strong indication that the user is engaged in outlier network activity. This type of information and analysis may facilitate identification of outlier network activity that would otherwise go undetected by prior art threshold techniques, which do not account for user relationships and behavior.

Figure 16:
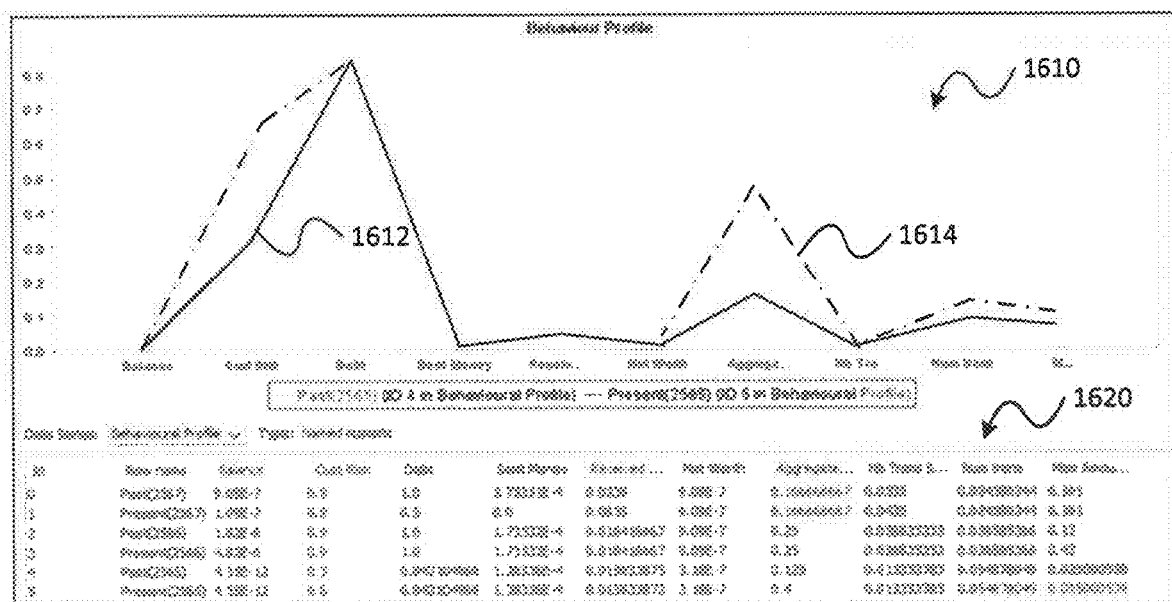
FIG. 16 is a screenshot illustrating a graphical user interface that is configured to present various views of information associated with outlier network activity identified in accordance with embodiments of the present disclosure.

Referring to FIG. 16, a screenshot illustrating a graphical user interface that is configured to present various views of information associated with outlier network activity identified in accordance embodiments of the present disclosure is shown. In FIG. 16, a chart view 1610 and a table view 1620 are shown. The table view 1620 may present information regarding a user's past and current behavior. This enables the end user to conduct an investigative analysis on a specific customer case and study the customer's previous versus current behavior, which may help the end user understand any changes in that user's behavior over time. In this manner, the end user may be able to see what KPI/feature changed from one day to another which triggered identification of a particular user as being associated with or engaging in outlier network activity. In the table view 1620, different columns may be associated with different data points, such as network metrics, user activity information, or other information that may be associated with driving the outlier behavior. In aspects, the underlying values may be presented as normalized values so that the different data points are presented using a similar scale, which may allow the information to be used to quantify how different the user's present behavior is from past behavior.

As described above with reference to the table view 1200, in aspects, different rows of the table view 1620 may include information associated with the same user at different points in time. To compare the user's current and past behavior, the interface shown in FIG. 16 may be configured to present the chart view 1610, where the user's current behavior is represented by the plot 1612, and the user's past behavior is represented by the plot 1614. In aspects, different points along the bottom of the chart view 1610 may correspond to different ones of the data points included in the table view, allowing the end user to identify particular data points associated with changes in the user's behavior, which may enable the user to quickly identify reasons why a particular user was identified as an outlier by the system (e.g., by the decision engine 160 of FIG. 1).

One or more of the interfaces illustrated in FIGS. 2-16 may be accessed from a control panel, or navigation menu, which may be provided in the various interfaces illustrated above. The control panel may provide different style and personalization features that may be applied to one or more of the interactive visualization tools described above to customize the nodes and edges (e.g., in a map view, tree view, or drawing view) or to otherwise enhance the way that the information is visually presented to the end user. Additionally, in aspects, one or more controls may provide filters that allow the end user to filter the visualizations based on specific features (e.g., important KPIs such as max amount sent, customer age, etc.) or network measures (degree, average distance, and the like). It is noted that the particular interface elements and their arrangements within the interfaces shown in FIGS. 2-16 have been provided for purposes of illustration, rather than by way of limitation, and that other elements and arrangements may be used to provide the functionality described herein.

To facilitate faster analysis of network models to identify outlier network activity, as described above with reference to FIG. 1, as well as the generation of the various views illustrated in the exemplary interfaces described above, a series of batch jobs may be created. The series of batch jobs may be created once the data sets have been compiled and validation of the modeling and analysis parameters is completed. The batch jobs may correspond to scripts that may facilitate execution of various processes in a particular sequence or may perform particular processing operations upon demand (e.g., a user can provide a command to execute one or more processing operations described above with respect to the detection device 110). In aspects, the series of batch jobs may include one or more of the jobs listed in Table 2 below.

TABLE 2

| Batch ID | Batch job name | Processes running |
|---|---|---|
| Pre-Batch | Data Mart creation | Generate new data mart |
| Pre-Batch | Data Mart refresh | Update data mart |
|  |  | Generation of backup tables |
| 1 | Feature selection | Feature selection |
| 2 | Dimensionality Reduction | Dimensionality Reduction |
| 3 | Construct model | Graph generation |
|  |  | Graph pruning and adjustments |
| 4 | Run supervised models (Attribute prediction, Network measures, Link prediction) | Attribute score generation (via PPR) Tuning and testing PPR Generate network measures Shortest abnormal path computation-Link Prediction |
| 5 | Community detection | Generate abnormal community groups Sample customers to investigate from abnormal communities |
| 6 | Decision engine | ML lib classifier Consolidation scoring Ensemble of consolidated scores Case production scoring |
| 7 | Validation of models | Tune and test net classifier (cross-validation) Validate stability for end user mislabelling |
| 8 | Visualisation | Generation of Visualisation master-tables |

As shown in Table 2, various batch processing operations may be defined, and these batch processing operations may be utilized to analyze data sets in accordance with the present disclosure. Batch processing may allow end users to modify the parameters of each model in order to tune them and achieve optimization, which may improve the results of investigations that each end user is undertaking. As briefly described above, scripts may be written to execute the various batch processing operations, and from these scripts, corresponding batch jobs may be created to run these various modeling operations in an efficient manner and to allow the end user to tune the parameters of the model prior to model execution.

As shown in Table 2, a pre-batch process may create a data mart for a particular use case/data set(s). Following this stage, there may be two processes that may be used to manage existing data marts (e.g., an update data mart process and a backup data mart process). Once the data mart has been created and validated, a series of eight batch jobs may be used to process various executions of the models and processes to facilitate outlier network activity analysis in accordance with embodiments of the present disclosure. It is noted that in some aspects, all batch job processes may be executed successively, while in other aspects, only a portion of the batch job processes may be executed, depending on the particular type of processing being performed. The end user may input the parameters desired for each part of the solution in order to customize the processing depending on the end user's needs.

As seen in the tuning section for attribute prediction, a model may have parameters that can easily be tuned and the running of the code can be done by a user who does not have prior technical knowledge of the code that has been written. For example, one or more of the interactive tools provided in accordance with aspects of the present disclosure may provide for configuration of these parameters via input of desired parameter values (e.g., selection from a drop down list, a menu, etc.), and then the input parameter values may be automatically used to configure an execution of one or more of the batch job processes.

In aspects, these batch job processes may be utilized to execute both supervised and unsupervised runs, each capable of generating the results of the different models described above with reference to FIGS. 1-16. In aspects, an unsupervised run may use the community detection modeling techniques (e.g., without utilizing the link prediction and attribute prediction processes). In aspects, a supervised run may use the attribute and link prediction models (e.g., without utilizing the community detection processes). Both of these runs in conjunction may be used to form the set of outputs upon which the decision engine logic is executed. In aspects, if an unsupervised run is not executed, the decision engine logic may be executed on the two supervised outputs alone. It is noted however, that unsupervised runs may be configured to utilize one or more other techniques, such as the attribute prediction and/or the link prediction modeling techniques in accordance with aspects of the present disclosure, and/or supervised runs may be configured to utilize one or more other techniques, such as the community detection modeling techniques in accordance with aspects of the present disclosure.

Table 3 below illustrates one possible scenario for scheduling when each of these runs may be executed to keep the solution up to date with the new data.

TABLE 3

| Process of execution | Batch processes sequence | Occurrence |
| --- | --- | --- |
| Supervised run | 1 → 2 → 3 → 4 → 6 → (7) → 8 | Daily |
| Unsupervised run | 1 → 3 → 5 → (7) → 8 | Daily |
| Update Data Mart and KPIs | Pre-Batch | Quarterly |

In aspects, one or more of the runs may be validated by performing the run(s) multiple times. For example, a supervised or unsupervised run may be validated by executing the run eight times. However, it is noted that other numbers of run executions may be used to perform validation of the results. It should be understood that the schedule identified in Table 3 is provided for purposes of illustration, rather than by way of limitation, and that other schedules may be utilized in accordance with the embodiments disclosed herein.

Figure 17:
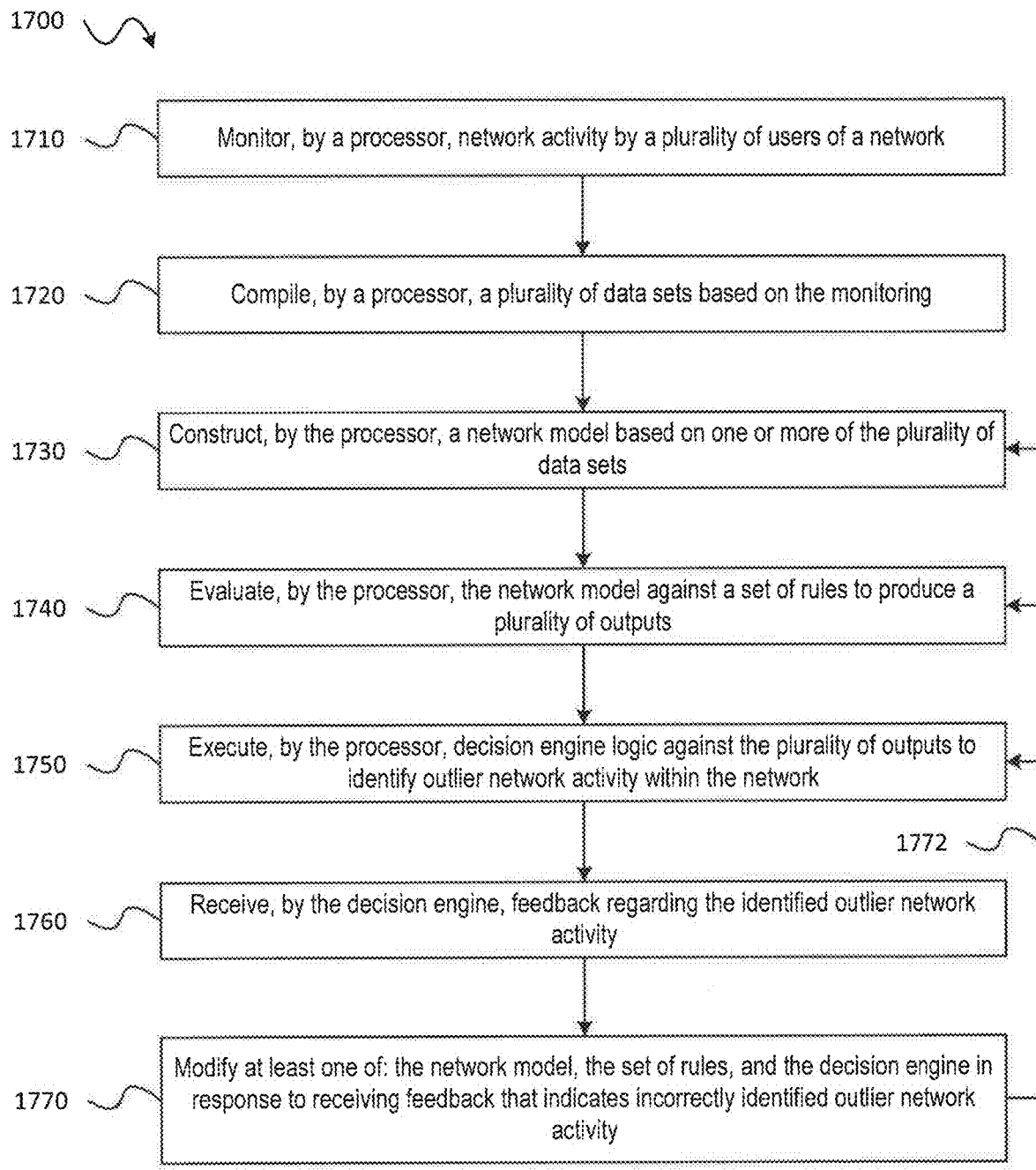
FIG. 17 is a flow diagram of illustrating aspects of an exemplary embodiment of a method for identifying outlier activity in a network.

Referring to FIG. 17, a flow diagram illustrating aspects of an exemplary embodiment of a method for identifying outlier activity in a network is shown as a method 1700. In aspects, the method 1700 may be stored at a memory (e.g., the memory 114 of FIG. 1) as instructions (e.g., the instructions 116 of FIG. 1) that, when executed by one or processors (e.g., the one or more processors 112 of FIG. 1), cause the one or more processors to perform the operations of the method 1700. In aspects, the method 1700 may be performed by a device or collection of devices, such as the detection device 110 of FIG. 1.

At 1710, the method 1700 includes monitoring, by a processor, activity by a plurality of users. It is noted that in some aspects, the monitoring may be omitted, as described above with reference to FIG. 1. At 1720, the method 1700 includes compiling, by the processor, a plurality of data sets based on the monitoring, each of the plurality data set's information representative of the network activity by the plurality of users. As explained above with reference to FIG. 1, the compiling of the data sets may be based on information observed during the monitoring, or if the monitoring step 1710 is omitted, the one or more data sets may be compiled based on information received or retrieved from a database, such as a service provider database. Compiling the data sets may include transformation of the data from relational data to a format that is compatible with the various analytics algorithms of embodiments and/or validating that the data sets include the appropriate variable data (or generating the appropriate variable data when it is not present), as described above with reference to FIG. 1.

At 1730, the method 1700 includes constructing, by the processor, a network model based on one or more of the plurality of data sets. The network model may be representative of at least a portion of the network activity, and constructing the network model may include constructing a graph, as described above with reference to FIG. 1. For example, in an aspect, constructing the graph may include: identifying a set of features associated with a model use case corresponding to target outlier network activity; generating an association matrix based on relational data included in the one or more data sets and the set of features; and constructing a graph based on the association matrix, as described above with reference to FIG. 1. Constructing the graph may also include applying an edge weight to each edge of the plurality of edges. The edge weight applied to a particular edge may be representative of an association strength between a pair of nodes that are connected by the particular edge within the graph. The computational complexity of the constructed graph may be reduced using a set of pruning rules. For example, in aspects, a set of pruning rules may be applied to the graph to produce a reduced complexity graph, where the set of pruning rules is configured to remove at least one of nodes and edges from the graph. The pruning of the graph may be performed as described above with reference to FIG. 1, such as keeping a top-N nearest or strongest N number of connections for each node; keeping a fixed number of nearest neighbor nodes having a similarity weight with a magnitude larger than a defined threshold; or using both the top-N nearest or strongest neighbors technique and the fixed number of nearest neighbors with similarity weight magnitude that satisfies the threshold technique. It is noted that these exemplary techniques for pruning the graph have been provided for purposes of illustration, rather than by way of limitation, and that other techniques may be utilized to prune graphs constructed in accordance with the present disclosure.

At 1740, the method 1700 may include evaluating, by the processor, the network model against a set of rules to produce a plurality of outputs. The plurality of outputs may include at least one of: a set of classifications, a set of link metrics, and a set of communities, as described above with reference to FIG. 1. The set of rules may include one or more attribute prediction rules configured to produce the set of classifications, as described above with reference to FIG. 1. For example, evaluating the network model against the one or more attribute prediction rules may include: analyzing characteristics of connections between different ones of the plurality of nodes; determining a set of node rankings based on the analyzing; and assigning, by the processor, each node of the plurality of nodes to one of a plurality of classes based on the set of node rankings. A PageRank algorithm may be utilized to determine the rankings of the nodes, as described above with reference to FIG. 1. Additionally, the rankings may be determined using another technique, such as a Gibbs sampling algorithm, an iterative classification algorithm, a relaxation labeling algorithm, and a loopy belief propagation algorithm, as described above with reference to FIG. 1. Assigning the classifications based on the determined node rankings may be performed using a Euclidian distance technique, a dichotomization technique, or a combination thereof, as described above with reference to FIG. 1. The set of classifications may include at least a first classification and a second classification, where the first classification is assigned to nodes suspected of outlier network activity and the second classification is assigned to nodes that are not suspected of outlier network activity. In aspects, evaluating the network model against the one or more attribute prediction rules may include injecting outlier nodes into the network model, as described above with reference to FIG. 1.

The set of rules may include one or more link prediction rules configured to produce the set of link metrics, as described above with reference to FIG. 1. Evaluating the network model against the one or more link prediction rules may include calculating one or more network metrics for the nodes of the network model. Calculating the one or more network metrics may include: calculating a degree metric for each node of the plurality of nodes, where the degree metric indicates, for a particular node, a number of neighbors that the particular node has; identifying triangle metrics associated with the network model, where each triangle metric identifies a group of three nodes that are each connected to each other; and computing shortest path metrics for the plurality of nodes, where the shortest path metrics indicate a minimum distance needed to reach a first node from a second node, as described above with reference to FIG. 1. Evaluating the network model against the one or more link prediction rules may also include calculating a centrality score for each node based on the network metrics. As described above with reference to FIG. 1, the set of centrality scores indicate a strength of connections between the nodes. The set of link metrics may include the set of centrality scores calculated for each node.

The set of rules may include one or more community detection rules configured to produce the set of communities, and evaluating the network model against the one or more community detection rules may include: analyzing connections between the plurality of nodes; and identifying, based on the analyzing, a plurality of subgroups within the plurality of nodes. Each subgroup may correspond to a community of closely connected nodes. The plurality of subgroups may be identified based on a label propagation scheme configured to assign a relevance score to each of the plurality of nodes, where nodes that are closely connected are assigned higher scores than nodes that are not closely connected and where a community corresponds to a grouping of nodes having similar relevance scores. The plurality of subgroups may additionally or alternatively be identified using at least one of a Kernihgan-Lin algorithm, a hierarchical clustering scheme, a Girvan-Newman clustering scheme, a modularity optimization scheme, and a clique percolation method, as described above with reference to FIG. 1.

At 1750, the method 1700 includes executing, by the processor, decision engine logic against the plurality of outputs to identify outlier network activity. A report that identifies at least the network activity that has been classified as outlier network activity may be generated by the decision engine in response to completing the execution of the decision engine logic against the set of outputs, as described above with reference to FIG. 1. The report may be displayed at a graphical user interface, such as one of the graphical user interfaces illustrated with reference to FIGS. 2-16. The report may also be provided as an e-mail, a text message, an audible alert, or some other form of alert configured to notify an end user that outlier network activity has been identified.

Executing the decision engine logic against the plurality of outputs to identify the outlier network activity may include: receiving, by a decision engine, each of the plurality of outputs; processing, by the decision engine, each of the plurality of outputs to produce a set of outlier network activity predictions; and identifying, by the decision engine, the outlier network activity based on the set of outlier network activity predictions, as described above with reference to FIG. 1. Processing each of the plurality of outputs to produce the set of outlier network activity predictions may include: evaluating, by the decision engine, each of the plurality of outputs; predicting, by the decision engine, suspected outlier network activity based on each of the plurality of outputs to produce the set of outlier network activity predictions; and identifying, by the decision engine, outlier network activity based on the set of outlier network activity predictions. Evaluating the outputs may include determining, for a particular node, whether information included in each of the outputs suggests that the particular node is associated with outlier network activity, as described above with reference to FIG. 1.

The set of outlier network activity predictions may correspond to a set of votes, each of which indicates whether particular network activity and/or nodes are suspected of being outlier network activity, as described above with reference to FIG. 1, and identifying the outlier network activity based on the set of outlier network activity predictions may include applying, by the decision engine, a voting scheme to the set of outlier network activity predictions. The voting scheme may be configured to calculate a first number of votes and a second number of votes, the first number of votes corresponding to votes that indicate the particular network activity is outlier network activity and the second number of votes corresponding to votes that indicate the particular network activity is not outlier network activity, as described above with reference to FIG. 1. The identifying may also include determining, by the decision engine, whether the first number of votes is greater than the second number of votes and classifying each node as being associated with outlier network activity or non-outlier network activity based on whether the first number of votes is greater than the second number of votes, as described above with reference to FIG. 1. For example, in response to a determination that the first number of votes is greater than the second number of votes, the node and/or network activity may be classified as outlier network activity, and in response to a determination that the first number of votes is less than or equal to the second number of votes, the node and/or network activity may be classified as non-outlier network activity. Weights may be applied to the set of outlier network activity predictions, wherein the weights are configured to alter how outlier network activity predictions derived from particular ones of the plurality of outputs are counted, as described above with reference to FIG. 1. For example, the weights may be implemented to provide a weighted voting scheme, where predictions or votes derived from a particular output source are counted as a greater number of votes than predictions or votes derived from another output source, as described above with reference to FIG. 1.

Additionally, identifying, by the decision engine, outlier network activity based on the set of outlier network activity predictions may include: combining the set of outlier network activity predictions to form a final set of outlier network activity predictions; and identifying the outlier network activity based on the final set of outlier network activity predictions, as described above with reference to FIG. 1. The set of outlier network activity predictions may be combined using logistic regression, as described above with reference to FIG. 1.

At 1760, the method 1700 includes receiving, by the processor, feedback regarding the identified outlier network activity. The feedback may indicate whether the decision engine correctly identified network activity as outlier network activity. For example, when a node or network activity is identified as outlier network activity, a report may be generated to notify an end user of the newly raised case. In aspects, the report may be an alert or other type of notification and may be provided to the end user in various ways, such as an e-mail message, a short messaging service message (SMS), an instant message transmitted via an instant messaging utility, an audible alert, or other types of communication technology. The end user may utilize one or more of the interactive tools provided and/or the interfaces described above with respect to FIGS. 2-16 to investigate the raised case and make a final determination as to whether the node or network activity is outlier network activity. The results of the investigation may then be provided as feedback to validate that the raised case was in fact outlier network activity or to indicate that the raised case was a false positive and was not outlier network activity.

At 1770, the method 1700 includes modifying at least one of: the network model, the set of rules, and the decision engine in response to receiving feedback that indicates incorrectly identified outlier network activity, as described above. As indicated by the arrow 1772, as the feedback is used to modify at least one of the network model, the set of rules, and the decision engine, those changes may be used to execute subsequent runs of the various graph-based outlier network activity analysis processes in accordance with the present disclosure. For example, where a node was incorrectly identified as an outlier, the network model may be revised in response to the feedback to correctly label the node as a non-outlier (or normal) node. As explained above with reference to FIG. 1, by dynamically updating the network model in this manner, any impact (e.g., tainting of other nodes and/or network activity) caused by incorrectly identifying the node and/or network activity as being outlier network activity may be corrected and the result of that correction may propagate through the network model(s) during subsequent executions of outlier detection analysis. In this manner, the self-learning techniques implemented by a detection device operating in accordance with the method 1700 (e.g., the detection device 110) may automatically correct any incorrect classifications or labels of nodes similar to the incorrectly identified node. Additionally, this self-learning capability may enable the detection device to identify new and emerging cases of outlier network activity. For example, as network users and behaviors change, those changes may be reflected in one or more of the various types of graph analysis performed by the detection device 110. If the emerging activity exhibits behaviors similar to other known cases of outlier activity, the nodes exhibiting that activity may gravitate towards outlier network nodes and/or outlier network activity during one or more stages of the graph analysis, causing that activity to be detected by the detection device 110 as outlier network activity.

The method 1700 may also include operations designed to address suspected and/or confirmed outlier activity. For example, once a node is identified as being associated with outlier network activity, the method 1700 may include executing one or more processes to hinder the node (e.g., the user and/or devices associated with that user) from engaging in outlier network behaviors, such as disabling or restricting a user account, disabling or restricting the user's access to a network and/or network resource, disabling or restricting a device associated with the user, disabling or restricting access to a service by the user and/or a device of the user, and the like, as described above with reference to FIG. 1. In aspects, the method 1700 may further include operations to reduce a likelihood that nodes associated with an outlier node engage in outlier behavior. For example, the method 1700 may include initiating communications with users that are associated with a node that has been identified as an outlier node, and those communications may be configured to extract information from those users (e.g., identity verification, etc.), which may facilitate a determination as to whether those associated nodes are also engaging in outlier network activity and/or limit those users' access to services and/or network resources (or other mitigation operations) until further evaluation has been completed, as described above with reference to FIG. 1.

Although the embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for identifying outlier network activity, the method comprising:

monitoring, by a processor, activity by a plurality of users;
compiling, by the processor, a plurality of data sets based on the monitoring, each of the plurality data sets including information representative of the network activity by the plurality of users;
constructing, by the processor, a network model based on one or more of the plurality of data sets, wherein the network model includes a plurality of nodes and is representative of at least a portion of the network activity, and wherein each of the plurality of nodes corresponds to one of the plurality of users; wherein constructing the network model includes:
identifying a set of features associated with a model use case corresponding to target outlier activity;
generating an association matrix based on relational data included in the one or more data sets and the set of features;
constructing a graph based on the association matrix; and
applying a set of pruning rules to the graph to produce a reduced complexity graph;
evaluating, by the processor, the network model against a set of rules to produce a plurality of outputs, wherein the plurality of outputs includes, for each user of the plurality of users, at least one of: a classification, a link metric, and a community, wherein the classification identifies a user corresponding to a node of the plurality of nodes as an outlier or a non-outlier, wherein the link metric indicates a strength of a connection between two users of the plurality of users, and wherein the community identifies a subgroup of closely connected users of the plurality users;
executing, by the processor, decision engine logic against the plurality of outputs to identify outlier network activity; and
executing, by the processor, at least one process to mitigate identified outlier network activity.

2. The method of claim 1,
wherein the graph includes a plurality of nodes and a plurality of edges, wherein each node of the plurality of nodes corresponds to one of the plurality of users, and wherein each of the plurality of edges connects two nodes of the plurality of nodes; and
wherein the set of pruning rules is configured to remove at least one of nodes and edges from the graph.

3. The method of claim 2, further comprising applying an edge weight to each edge of the plurality of edges, wherein the edge weight applied to a particular edge is representative of an association strength between a pair of nodes connected by the particular edge.

4. The method of claim 1, wherein the set of rules includes one or more attribute prediction rules configured to produce a set of classifications that includes the classification for each user of the plurality of users, and wherein evaluating the network model against the set of rules includes evaluating the model against the one or more attribute prediction rules to produce the classification for each user of the plurality of users:
injecting outlier nodes into the network model, each outlier node corresponding to a known outlier user;
analyzing characteristics of connections between different nodes of the plurality of nodes;
determining a set of node rankings based on the analyzing; and
assigning, by the processor, each node of the plurality of nodes to one of a plurality of classes based on the set of node rankings to produce the set of classifications,
wherein the set of classifications classifies each user of the plurality of users into a first classification associated with outlier network activity or a second classification associated with non-outlier network activity.

5. The method of claim 1, wherein the set of rules includes one or more link prediction rules configured to produce the set of link metrics, and wherein evaluating the network model against the one or more link prediction rules includes:
determining a degree metric for each node of the plurality of nodes, wherein the degree metric indicates, for a particular node of the plurality of nodes, a number of neighbors that the particular node has;
identifying triangle metrics associated with the network model, wherein each triangle metric identifies a group of three nodes of the plurality of nodes that are connected to each other; and
computing shortest path metrics for the plurality of nodes, wherein the shortest path metrics indicate a minimum distance needed to reach a node of the plurality of nodes from another node of the plurality of nodes.

6. The method of claim 5, wherein evaluating the network model against the one or more link prediction rules includes calculating a centrality score for each node of the plurality of nodes based on the degree metrics, the triangle metrics, and the shortest path metrics, wherein the set of link metrics include a set of centrality scores calculated for each node of the plurality of nodes, and wherein the set of centrality scores indicate a strength of connections between different nodes of the plurality of nodes.

7. The method of claim 1, wherein the set of rules includes one or more community detection rules configured to produce the set of communities, and wherein evaluating the network model against the one or more community detection rules includes:
analyzing connections between the plurality of nodes;
identifying, based on the analyzing, a plurality of subgroups within the plurality of nodes, wherein each subgroup corresponds to a community of closely connected nodes; and
generating the set of communities based on the plurality of subgroups identified within the network model.

8. The method of claim 7, wherein the plurality of subgroups are identified according to at least one of a label propagation algorithm, a Kernighan-Lin algorithm, a hierarchical clustering scheme, a Girvan-Newman clustering scheme, a modularity optimization scheme, and a clique percolation method.

9. The method of claim 1, wherein executing the decision engine logic against the plurality of outputs to identify the outlier network activity includes:
receiving, by the decision engine, each of the plurality of outputs;
evaluating, by the decision engine, each of the plurality of outputs;
predicting, by the decision engine, suspected outlier network activity based on each of the plurality of outputs to produce a set of outlier network activity predictions; and
identifying, by the decision engine, outlier network activity based on the set of outlier network activity predictions.

10. The method of claim 9, further comprising applying, by the decision engine, weights to the set of outlier network activity predictions, wherein the weights are configured to alter how the outlier network activity is identified based on the set of outlier network activity predictions.

11. The method of claim 1, further comprising:
receiving, by the processor, feedback regarding the identified outlier network activity, wherein the feedback indicates whether the decision engine correctly identified network activity as outlier network activity; and
modifying at least one of: the network model, the set of rules, and the decision engine in response to receiving feedback that indicates incorrectly identified outlier network activity.

12. The method of claim 1, wherein the at least one process to mitigate the identified outlier network activity includes at least one of: disabling a user account, disabling a user device, disabling access by a user to a network, disabling access by a user to a network resource, and disabling access by a user to a service.

13. A system for identifying outlier network activity, the system comprising:
at least one processor configured to:
monitor network activity by a plurality of users;
compile a plurality of data sets based on the monitoring, wherein each of the plurality data sets includes information representative of the activity by the plurality of users;
construct a network model based on one or more of the plurality of data sets, wherein the network model includes a plurality of nodes and is representative of at least a portion of the network activity, and wherein each of the plurality of nodes corresponds to one of the plurality of users; wherein constructing the network model causes the at least one processor to:
identify a set of features associated with a model use case corresponding to target outlier activity;
generate an association matrix based on relational data included in the one or more data sets and the set of features;
construct a graph based on the association matrix; and
apply a set of pruning rules to the graph to produce a reduced complexity graph;
evaluate the network model against a set of rules to produce a plurality of outputs, wherein the plurality of outputs includes, for each user of the plurality of users, at least one of: a classification, a link metric, and a community, wherein the classification identifies a user corresponding to a node of the plurality of nodes as an outlier or a non-outlier, wherein the link metric indicates a strength of a connection between two users of the plurality of users, and wherein the community identifies a subgroup of closely connected users of the plurality users;
execute decision engine logic against the plurality of outputs to identify outlier network activity;
receive feedback regarding the identified outlier network activity, wherein the feedback indicates whether the decision engine correctly identified network activity as outlier network activity;
modify at least one of: the network model, the set of rules, and the decision engine in response to receiving feedback that indicates incorrectly identified outlier network activity; and
a memory coupled to the at least one processor.

14. The system of claim 13,
wherein the graph includes the plurality of nodes and a plurality of edges, wherein each of the plurality of nodes corresponds to one of the plurality of users, and wherein each of the plurality of edges connects two nodes of the plurality of nodes; and
wherein the set of pruning rules configured to remove at least one of nodes and edges from the graph.

15. The system of claim 13, wherein executing the decision engine logic against the plurality of outputs to identify outlier network activity within the network includes:
receiving, by the decision engine, each of the plurality of outputs;
evaluating, by the decision engine, each of the plurality of outputs;
predicting, by the decision engine, suspected outlier network activity based on each of the plurality of outputs to produce a set of outlier network activity predictions; and
identifying, by the decision engine, outlier network activity based on the set of outlier network activity predictions.

16. The system of claim 15, further comprising applying, by the decision engine, weights to the set of outlier network activity predictions, wherein the weights are configured to alter how the outlier network activity is identified based on the set of outlier network activity predictions.

17. The system of claim 13, wherein the set of rules includes one or more attribute prediction rules configured to produce a set of classifications that includes the classification for each user of the plurality of users, and wherein evaluating the network model against the set of rules includes evaluating the model against the one or more attribute prediction rules to produce the classification for each user of the plurality of users:
injecting outlier nodes into the network model, each outlier node corresponding to a known outlier user;
analyzing characteristics of connections between different nodes of the plurality of nodes;
determining a set of node rankings based on the analyzing; and
assigning, by the processor, each node of the plurality of nodes to one of a plurality of classes based on the set of node rankings to produce the set of classifications, wherein the set of classifications classifies each user of the plurality of users into a first classification associated with outlier network activity or a second classification associated with non-outlier network activity.

18. The system of claim 13, wherein the set of rules includes one or more link prediction rules configured to produce the set of link metrics, and wherein evaluating the network model against the one or more link prediction rules includes:
determining a degree metric for each node of the plurality of nodes, wherein the degree metric indicates, for a particular node, a number of neighbors that the particular node has;
identifying triangle metrics associated with the network model, wherein each triangle metric identifies a group of three nodes of the plurality of nodes that are connected to each other;
computing shortest path metrics for the plurality of nodes, wherein the shortest path metrics indicate a minimum distance needed to reach a node of the plurality of nodes from another node of the plurality of nodes; and
calculating a centrality score for each node based on the degree metrics, the triangle metrics, and the shortest path metrics, wherein the set of link metrics include a set of centrality scores calculated for each node of the plurality of nodes, and wherein the set of centrality scores indicate a strength of connections between different nodes of the plurality of nodes.

19. The system of claim 13, wherein the set of rules includes one or more community detection rules configured to produce the set of communities, and wherein evaluating the network model against the one or more community detection rules includes:

analyzing connections between the plurality of nodes;

identifying, based on the analyzing, a plurality of subgroups within the plurality of nodes, wherein each subgroup corresponds to a community of closely connected nodes; and generating the set of communities based on the plurality of subgroups identified within the network model.

20. A non-transitory computer-readable medium storing instructions that, when executed by one or more processors, cause the one or more processors to perform operations for identifying outlier activity in a network, the operations comprising:

monitoring, by a processor, network activity by a plurality of users of a network;

compiling, by the processor, a plurality of data sets based on the monitoring, each of the plurality data sets including information representative of the network activity by the plurality of users;

constructing, by the processor, a network model based on one or more of the plurality of data sets, wherein the network model includes a plurality of nodes and is representative of at least a portion of the network activity, and wherein each of the plurality of nodes corresponds to one user of the plurality of users;

wherein constructing the network model includes:

identifying a set of features associated with a model use case corresponding to target outlier activity;

generating an association matrix based on relational data included in the one or more data sets and the set of features;

constructing a graph based on the association matrix; and applying a set of pruning rules to the graph to produce a reduced complexity graph;

evaluating, by the processor, the network model against a set of rules to produce a plurality of outputs, wherein the plurality of outputs includes, for each user of the plurality of users, at least one of: a classification, a link metric, and a community, wherein the classification identifies a user corresponding to a node of the plurality of nodes as an outlier or a non-outlier, wherein the link metric indicates a strength of a connection between two users of the plurality of users, and wherein the community identifies a subgroup of closely connected users of the plurality users; and executing, by the processor, decision engine logic against the plurality of outputs to identify outlier network activity within the network.

\* \* \* \* \*